(12) United States Patent
Yan et al.

(10) Patent No.: US 12,354,226 B2
(45) Date of Patent: Jul. 8, 2025

(54) HARDWARE-AGNOSTIC INPUT FRAMEWORK FOR PROVIDING INPUT CAPABILITIES AT VARIOUS FIDELITY LEVELS, AND SYSTEMS AND METHODS OF USE THEREOF

(71) Applicant: META PLATFORMS TECHNOLOGIES, LLC, Menlo Park, CA (US)

(72) Inventors: Chengyuan Yan, San Bruno, CA (US); Joseph Davis Greer, Portland, OR (US); Sheng Shen, Shoreline, WA (US); Anurag Sharma, Dublin, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 165 days.

(21) Appl. No.: 18/175,437

(22) Filed: Feb. 27, 2023

(65) Prior Publication Data
US 2023/0281938 A1     Sep. 7, 2023

Related U.S. Application Data

(60) Provisional application No. 63/418,897, filed on Oct. 24, 2022, provisional application No. 63/315,470, filed on Mar. 1, 2022.

(51) Int. Cl.
  *G06T 19/00*   (2011.01)
  *G02B 27/01*   (2006.01)
  *G06F 3/01*    (2006.01)

(52) U.S. Cl.
  CPC .......... *G06T 19/006* (2013.01); *G02B 27/017* (2013.01); *G06F 3/012* (2013.01); *G06F 3/017* (2013.01)

(58) Field of Classification Search
  CPC ..... G06T 19/006; G02B 27/017; G06F 3/012; G06F 3/017
  See application file for complete search history.

(56) References Cited

U.S. PATENT DOCUMENTS

2018/0181199 A1* 6/2018 Harvey ............... G06F 3/014
2019/0362557 A1* 11/2019 Lacey ................. G06T 5/20
(Continued)

OTHER PUBLICATIONS

International Search Report and Written Opinion for International Application No. PCT/US2023/014223, mailed May 26, 2023, 9 pages.

(Continued)

*Primary Examiner* — Terrell M Robinson
(74) *Attorney, Agent, or Firm* — Morgan, Lewis & Bockius LLP

(57) ABSTRACT

The various implementations described herein include methods and systems for providing input capabilities at various fidelity levels. In one aspect, a method includes receiving, from an application, a request identifying an input capability for making an input operation available within the application. The method further includes, in response to receiving the request: identifying techniques that the artificial-reality system can use to make the requested input capability available to the application using data from one or more devices; selecting a first technique for making the requested input capability available to the application; and using the first technique to provide to the application data to allow for performance of the requested input capability.

20 Claims, 24 Drawing Sheets

(56) References Cited

U.S. PATENT DOCUMENTS

2020/0097081 A1* 3/2020 Stone ................. G06F 3/015
2020/0404591 A1* 12/2020 Kim .................. H04W 52/0251
2020/0409532 A1* 12/2020 Murphy ............... G02B 27/017
2021/0064132 A1 3/2021 Rubin et al.
2021/0152643 A1 5/2021 Mathur et al.

OTHER PUBLICATIONS

International Preliminary Report on Patentability for International Application No. PCT/US2023/014223, mailed Sep. 12, 2024, 8 pages.

* cited by examiner

HARDWARE-AGNOSTIC INPUT FRAMEWORK FOR PROVIDING INPUT CAPABILITIES AT VARIOUS FIDELITY LEVELS, AND SYSTEMS AND METHODS OF USE THEREOF

PRIORITY AND RELATED APPLICATIONS

This application claims priority to U.S. Provisional App. No. 63/315,470, filed on Mar. 1, 2022, titled "A Hardware-Agnostic Input Framework for Providing Input Capabilities at Various Fidelity Levels, and Systems and Methods of Use Thereof," and U.S. Provisional App. No. 63/418,897, filed on Oct. 24, 2022, titled "A Hardware-Agnostic Input Framework for Providing Input Capabilities at Various Fidelity Levels, and Systems and Methods of Use Thereof," each of which is incorporated herein in its entirety.

TECHNICAL FIELD

The present disclosure relates generally to input frameworks, including but not limited to hardware-agnostic input frameworks for providing input capabilities at varying fidelity levels.

BACKGROUND

Artificial-reality devices offer a variety of input modalities, such as by using hardware and sensor capabilities provided by a keyboard and mouse, a camera, a controller, a motion tracker, and a voice input identifier. An artificial-reality application allows users to interact using one or more of the varieties of input modalities. However, conventional input frameworks have limitations, such as input modalities that are bound to specific hardware. Therefore, the artificial-reality applications must explicitly choose which modalities to support. As a result, many conventional artificial-reality applications conservatively choose to support only a minimal set of input modalities. For example, the artificial-reality applications may simply disable hand tracking if cameras are turned off, even though a wrist device could offer medium-level fidelity hand tracking.

SUMMARY

The present disclosure describes a hardware-agnostic input framework for an artificial-reality system, the hardware-agnostic input framework being configured to address one or more of the problems identified above, including by mitigating hardware fragmentation and increasing the available input capabilities by offering options at a variety of fidelity levels (not just a highest fidelity level, but also lower fidelity levels that many current systems do not consider offering to applications), based on available hardware resources, to ensure that more input capabilities can be offered to artificial-reality applications. For example, upon system initialization, the input framework (which can be an operating-system level framework that is exposed to individual applications) examines the hardware platform and enumerates the input capabilities and fidelity levels that can be supported by the hardware platform. The hardware platform includes hardware available for use in providing certain input capabilities to an artificial-reality system. In this example, applications operating on the platform notify the input framework of their needed input capabilities and the minimum fidelity levels at which the application needs those input capabilities to be provided. Example input capabilities include hand orientation, hand position, hand action, controller orientation, controller position and controller action. In this example, the input framework attempts to support the required capabilities and fidelity levels with the currently available hardware. As a further example, when the input framework determines that the currently-available hardware cannot support the required capabilities and associated fidelity levels, the input framework notifies the application (or a user) of the deficiency and optionally provides suggested solutions.

As another example, constrained by weight and appearance, artificial-reality glasses alone may enable a core user experience that can be augmented by accessory devices, when they are available, for a higher quality device interaction. For example, artificial-reality glasses may only provide a display and two forward cameras (e.g., for position tracking). The glasses may be able to provide hand interaction but would require the user to hold their hands up in front of the cameras, which could be socially awkward and quickly trigger fatigue, and result in user dissatisfaction with these new paradigms. The user in this example may choose to keep a controller in the backpack, or wear a connected smartwatch, for more accurate and reliable input. In this way, hardware resources of an artificial-reality system may not be available all the time, so the ability to make use of a framework (which can be an operating-system level framework that is exposed to individual applications with application programming interfaces (APIs)) to adaptively provide input capabilities using different available hardware or sensor resources is advantageous and helps to ensure that input capabilities needed by different applications can be supported using different combinations of available hardware resources.

An example system includes artificial-reality glasses and a smartwatch (which can be more generally referred to as a head-worn wearable device and a wrist-wearable device, respectively). In various scenarios some of the hardware functionality may not be available to the system. As a first scenario, the user in this example may sometimes choose to leave the smartwatch charging and use a controller instead. As a second scenario, the GPS on the smartwatch could temporarily be disabled (e.g., because the smartwatch is too hot). As a third scenario, the camera on the glasses might be turned off by the user, e.g., because the user is in public space and needs to respect others' privacy. In conventional artificial-reality systems, the applications required support a lot more input modalities and individually manage the transitions between those modalities when hardware availability changes (e.g., an operating-system-level framework is not available at all, and individual applications must be aware of and individually manage hardware-resource availability within each individual application). Conversely, in the systems of the present disclosure, the input framework (e.g., which can run at an operating-system level) examines the hardware platform (e.g., at system startup, which can correspond to a power on event for an operating system) to enumerate the input capabilities and fidelity levels that can be supported on the platform based on available hardware resources. In such a system, the applications inform the input framework (e.g., at launch) as to which input capabilities they need and the minimum fidelity level for each. The input framework maps the required capabilities and fidelity levels with any hardware currently available, e.g., selecting a hardware option having the highest fidelity.

In accordance with some embodiments, a method is performed on an artificial-reality system that includes one or more human-machine-interface (HMI) devices (the HMI devices can be the hardware resources discussed above that can each be associated with the artificial-reality system). The method includes: (i) receiving, from an application executing on an operating system associated with the artificial-reality system, a request identifying a requested input capability for making an input operation available within the application; and (ii) in response to receiving the request: (a) identifying, by the operating system, two or more techniques that the artificial-reality system can use to make the requested input capability available to the application using data from the one or more HMI devices, each of the two or more techniques associated with a respective fidelity level; (b) selecting a first technique of the two or more techniques for making the requested input capability available to the application; and (c) using the first technique to provide, to the application, data to allow for performance of the requested input capability. This method can be performed at a wrist-wearable device, a head-worn wearable device, or an artificial-reality console that is configured to control, and is communicatively coupled with, the HMI devices mentioned above. In another example, an artificial-reality system can be said to perform the method by using any one of its component devices to individually perform the method's operations.

In some embodiments, a computing device (which can be a wrist-wearable device, a head-worn wearable device, or an artificial-reality console that is configured to control, and is communicatively coupled with, the HMI devices mentioned above) includes one or more processors, memory, a display, and one or more programs stored in the memory. The programs are configured for execution by the one or more processors. The one or more programs include instructions for performing any of the methods described herein.

In some embodiments, a non-transitory computer-readable storage medium (which can be an executable file stored on a server for distribution via an application store) stores one or more programs configured for execution by a computing device having one or more processors, memory, and a display. The one or more programs include instructions for performing any of the methods described herein.

Thus, methods and systems are disclosed for providing input capabilities in an adaptive and dynamic manner, which can alleviate the requirement for individual applications to have to self-manage hardware resources by instead allowing all applications to access an operation-system level framework that identifies the input capabilities that can be offered to each application at certain fidelity levels. Such methods may complement or replace conventional methods for providing input capabilities.

Note that the various embodiments described above can be combined with any other embodiments described herein. The features and advantages described in the specification are not necessarily all inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes, and may not have been selected to delineate or circumscribe the subject matter described herein.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to necessarily be considered limiting, for the description may admit to other effective features as the person of skill in this art will appreciate upon reading this disclosure.

Figure 1A:
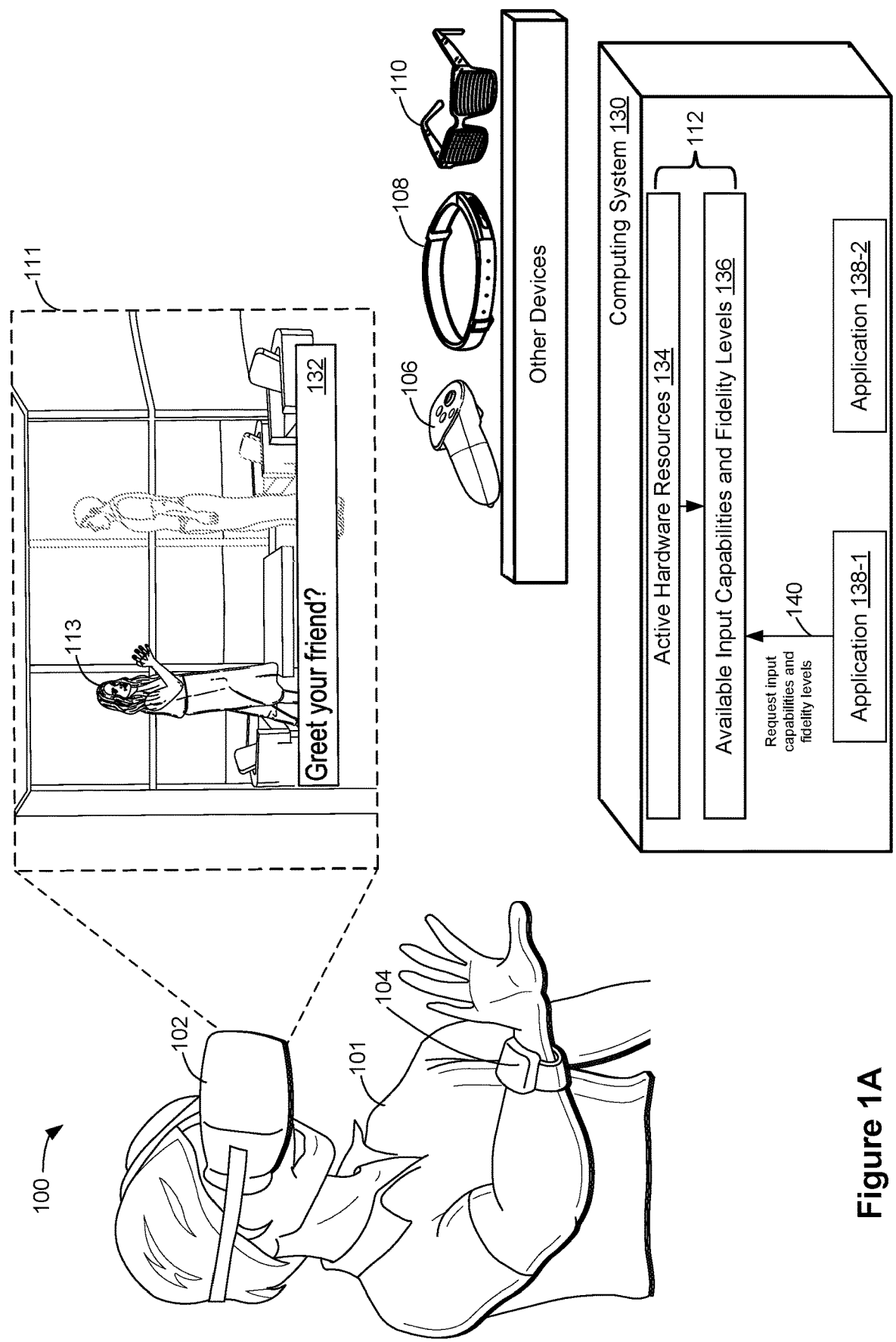
FIG. 1A illustrates an example artificial-reality system in accordance with some embodiments.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not necessarily been described in exhaustive detail so as to avoid obscuring pertinent aspects of the embodiments described herein.

To orient the reader, an example scenario is provided first to illustratively describe an example use of the hardware-agnostic input framework for providing input capabilities at various fidelity levels. In this example scenario, an architecture student, John, comes to the library to work on a design for a community park. He finds an empty desk and starts working with a 3D modeling application. Using artificial-reality glasses, he can view the 3D sculpture assets and use his hands to place them in a model park and add annotations. In this scenario, the modeling application requires at least low-fidelity hand action, at least low-fidelity hand position, and at least medium-fidelity head pose.

To continue the scenario, John is then informed by a librarian that cameras are not currently allowed in the library due to privacy concerns. Accordingly, John switches the camera off. In a conventional system, John may receive a message from the artificial-reality system that he will not be able to use the application any longer, because both the head position tracking and the hand tracking were using the camera. At this point, John has to either stop working or find another place where he can turn the cameras back on.

In a system of the present disclosure, with the active cameras on the glasses, the input framework is able to provide medium-fidelity hand action, high-fidelity hand position, and high-fidelity head pose, so the app runs smoothly. When John deactivates the cameras, the input framework continues to support the modeling application using different hardware options. For example, using low-fidelity hand action and low-fidelity hand pose from a smartwatch that John is wearing, e.g., via a built-in inertial measuring unit (IMU), and the medium-fidelity head pose using an IMU in the glasses and a body model. In this way, John is able to continue working without interruption.

To continue the scenario, next John starts adding annotations to his model park. For this operation, the modeling application requests medium-fidelity hand position, because it is dealing with smaller objects and more subtle placement. The input framework determines that additional hardware must be activated to fulfill the request, and may show John a notification, such as "The feature you are trying to use requires additional hardware: proximity sensors on smartwatch." Accordingly, John turns on the proximity sensors on his smartwatch, and the input framework maps the new sensor data to a hand pose estimator. In response, the fidelity level for hand position upgrades to medium and John continues with the project.

Embodiments of this disclosure may include or be implemented in conjunction with various types of artificial-reality systems. Artificial reality constitute a form of reality that has been altered by virtual objects for presentation to a user. Such artificial reality may include and/or represent virtual reality (VR), augmented reality (AR), mixed reality (MR), hybrid reality, or some combination and/or variation of one or more of the these. Artificial-reality content may include completely generated content or generated content combined with captured (e.g., real-world) content. The artificial-reality content may include video, audio, haptic feedback, or some combination thereof, any of which may be presented in a single channel or in multiple channels (such as stereo video that produces a three-dimensional effect to a viewer). Additionally, in some embodiments, artificial reality may also be associated with applications, products, accessories, services, or some combination thereof, which are used, for example, to create content in an artificial reality and/or are otherwise used in (e.g., to perform activities in) an artificial reality.

Artificial-reality systems may be implemented in a variety of different form factors and configurations. Some artificial-reality systems are designed to work without near-eye displays (NEDs), an example of which is the artificial-reality system 300 in FIG. 9A. Other artificial-reality systems include an NED, which provides visibility into the real world (e.g., the augmented-reality system 320 in FIG. 9B) or that visually immerses a user in an artificial reality (e.g., the virtual-reality system 350 in FIG. 9C). While some artificial-reality devices are self-contained systems, other artificial-reality devices communicate and/or coordinate with external devices to provide an artificial-reality experience to a user. Examples of such external devices include handheld controllers (e.g., the controller device 106), mobile devices, desktop computers, devices worn by a user (e.g., the wearable device 104), devices worn by one or more other users, and/or any other suitable external system.

FIG. 1A is a diagram illustrating an artificial-reality system 100 in accordance with some embodiments. The artificial-reality system 100 includes multiple human-machine-interface (HMI) devices. While some example devices and features are illustrated, various other devices and features have not been illustrated for the sake of brevity and so as not to obscure pertinent aspects of the example embodiments disclosed herein. To that end, as a non-limiting example, the system 100 includes a head-mounted display 102, a wearable device 104, a controller device 106, a head-worn device 108, and an eyewear device 110, which are used in conjunction with a computing system 130. In the example of FIG. 1A, the head-mounted display 102 and the wearable device 104 are active (e.g., in use by the user) and the other devices, including the controller device 106, the head-worn device 108, and the eyewear device 110 are inactive. In the example of FIG. 1A, the user 101 is wearing the head-mounted display 102 and the wearable device 104.

The computing system 130 in FIG. 1A includes an input framework 112 that identifies activate hardware resources 134 (e.g., the head-mounted display 102 and the wearable device 104) and determines available input capabilities and fidelity levels 136 based on the active hardware resources 134. The computing system 130 further includes a plurality of applications 138 (e.g., application 138-1 and application 138-2). In the example scenario of FIG. 1A, the application 138-1 (e.g., a virtual-reality application) has requested 140 input capabilities and fidelity levels from the input framework 112 (e.g., to enable corresponding in-game actions). FIG. 1A further shows an example virtual-reality scene 111 with a user avatar 113 and a greetings prompt 132.

Figure 1B:
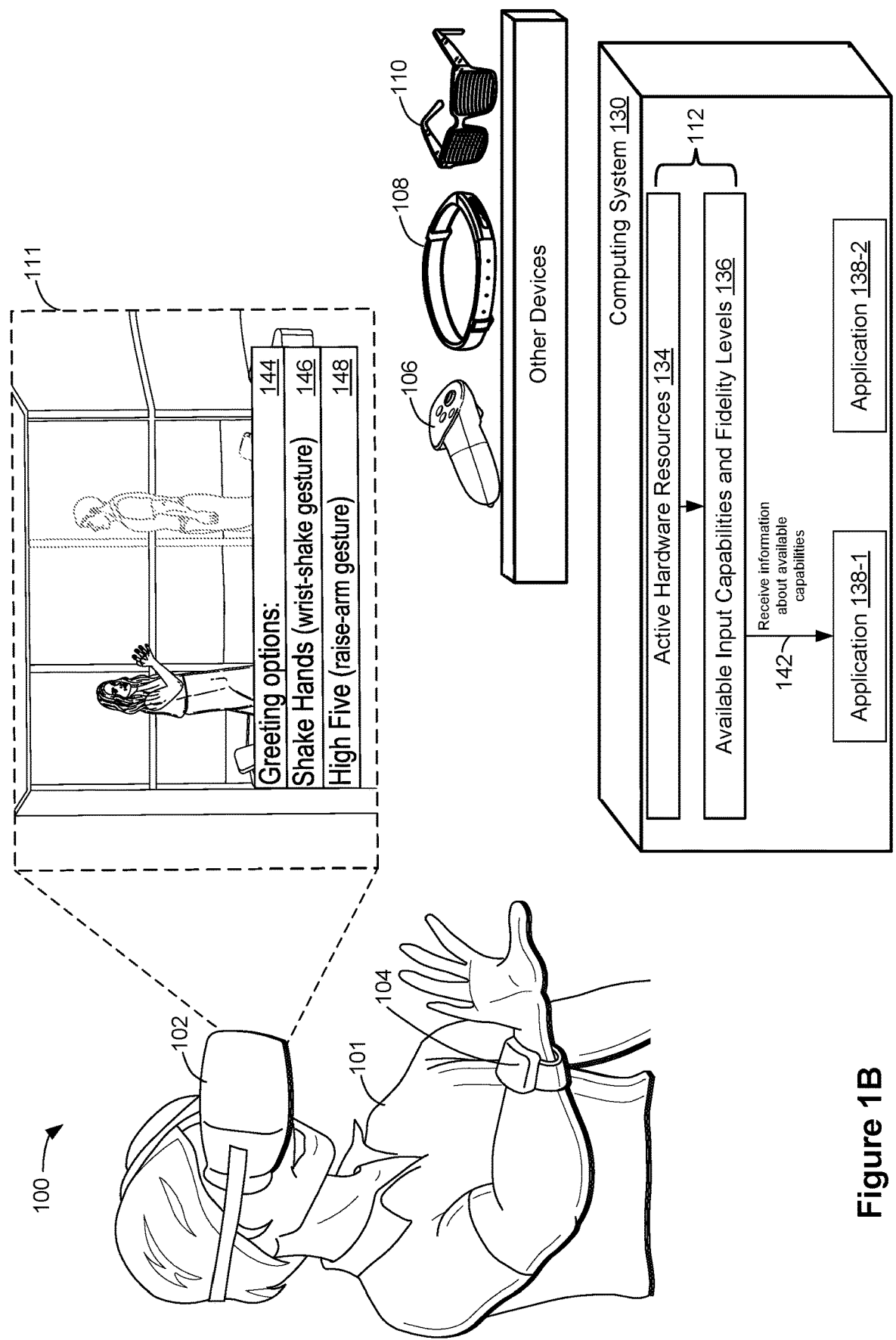
FIGS. 1B-1C illustrate an example user scenario with the artificial-reality system of FIG. 1A in accordance with some embodiments.
Figure 1C:
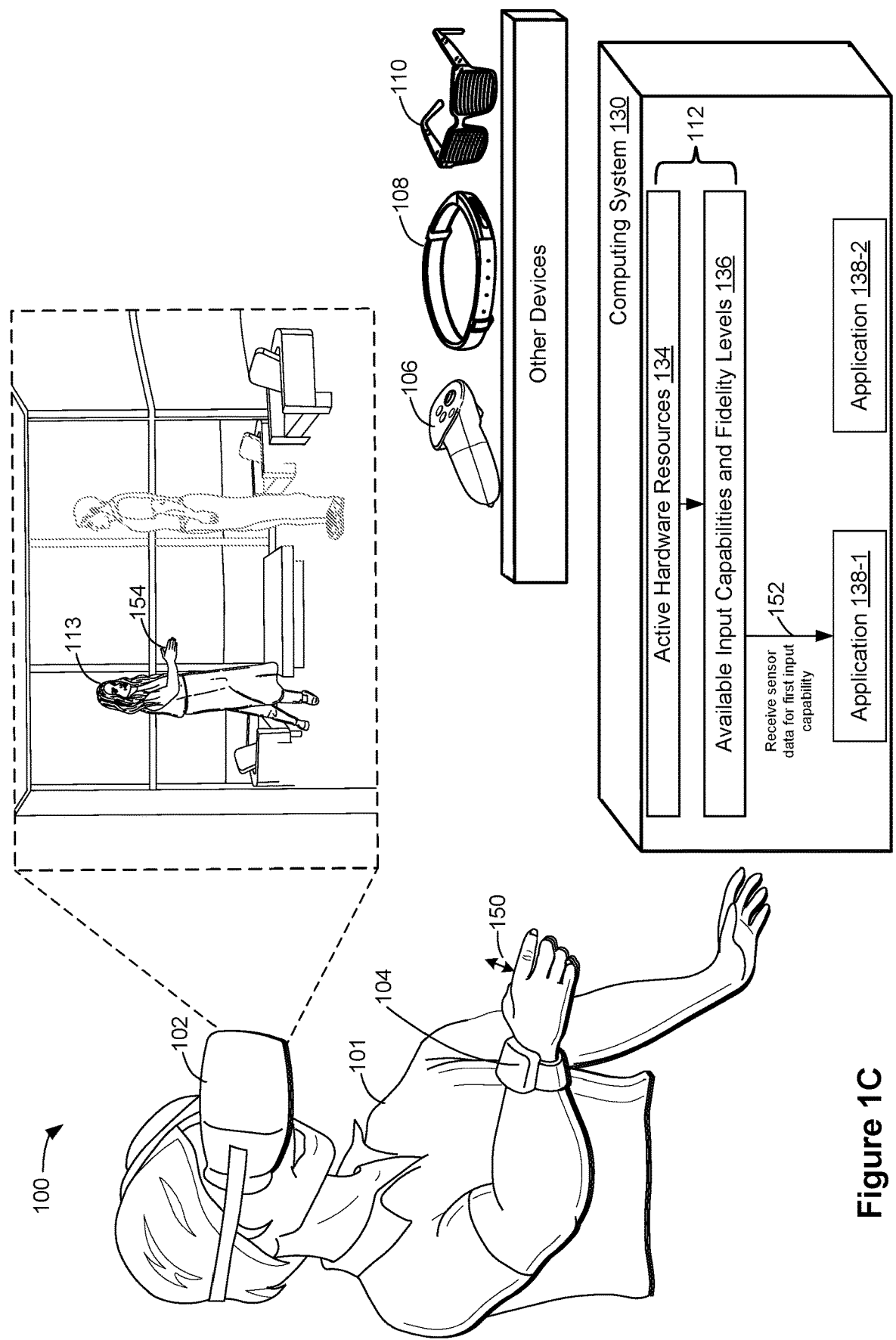

FIGS. 1B-1C illustrate an example user scenario with the artificial-reality system 100 in accordance with some embodiments. FIG. 1B shows the application 138-1 receiving information 142 about currently available capabilities of the artificial-reality system 100 from the input framework 112. In the example of FIG. 1B, the available capabilities include being able to detect a wrist-shake gesture and a raise-arm gesture, e.g., using sensor(s) of the wearable device 104 and/or the head-mounted display 102. FIG. 1B further shows the virtual-reality scene 111 with a greetings options menu 144. The greetings option menu 144 includes a shake-hands greeting 146 that corresponds to the wrist-shake gesture and a high five greeting 148 that corresponds to the raise-arm gesture. In some embodiments, the options in the greetings option menu 144 are based on the available capabilities of the artificial-reality system 100. In some embodiments, the application 138-1 has one or more additional greeting options that are not shown in the greeting options menu 144 as the one or more additional greeting options are disabled due to a lack of support from the current available capabilities (e.g., a verbal greeting option is disabled in accordance with the active devices not having a microphone).

FIG. 1C shows the user 101 making a wrist-shake gesture 150 and the input framework 112 sending corresponding sensor data 152 to the application 138-1. FIG. 1C further shows the user's avatar 113 initiating a handshake 154 in accordance with the wrist-shake gesture 150.

Figure 2A:
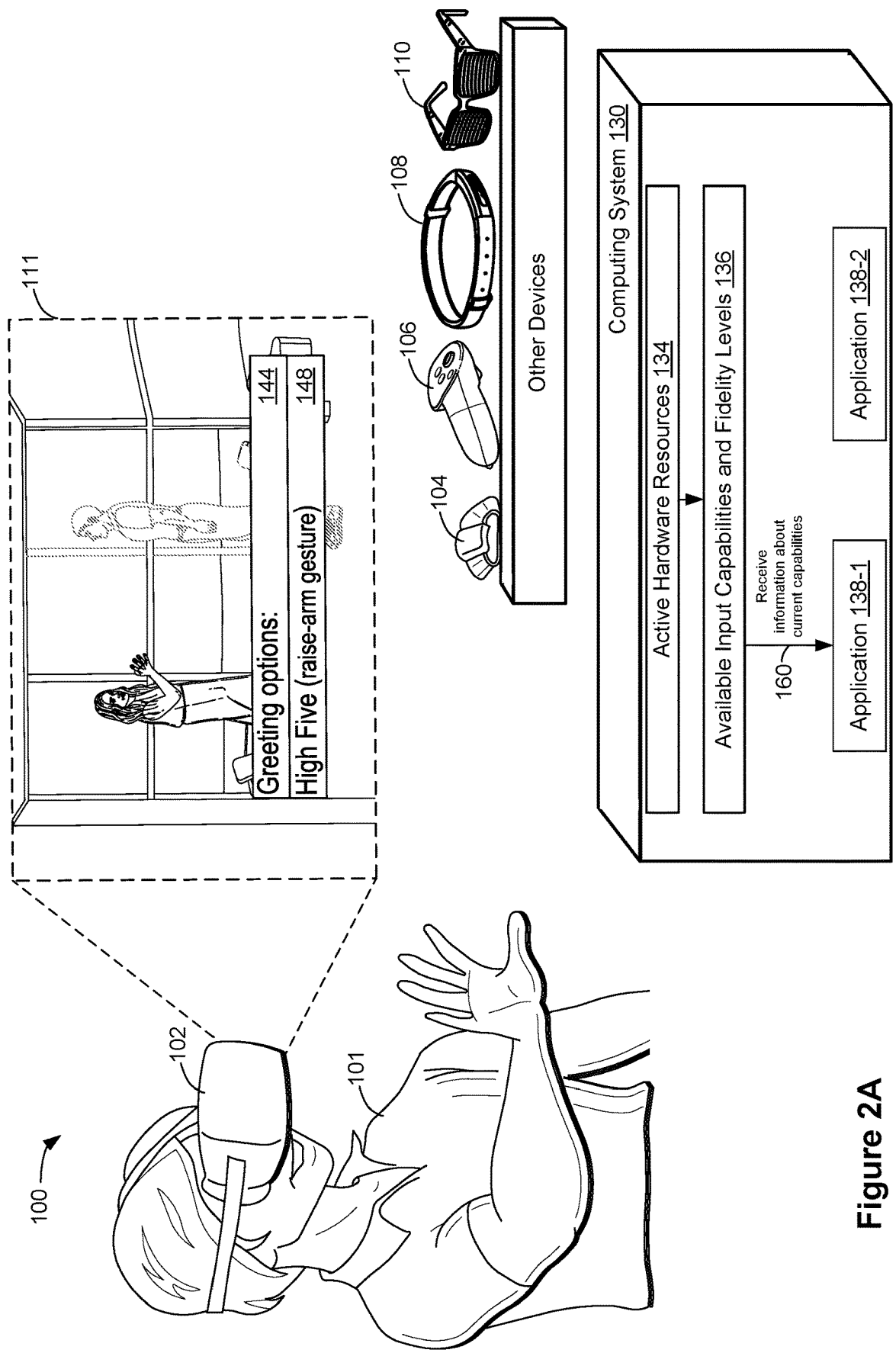
FIGS. 2A-2B illustrate another example user scenario with the artificial-reality system of FIG. 1A in accordance with some embodiments.
Figure 2B:
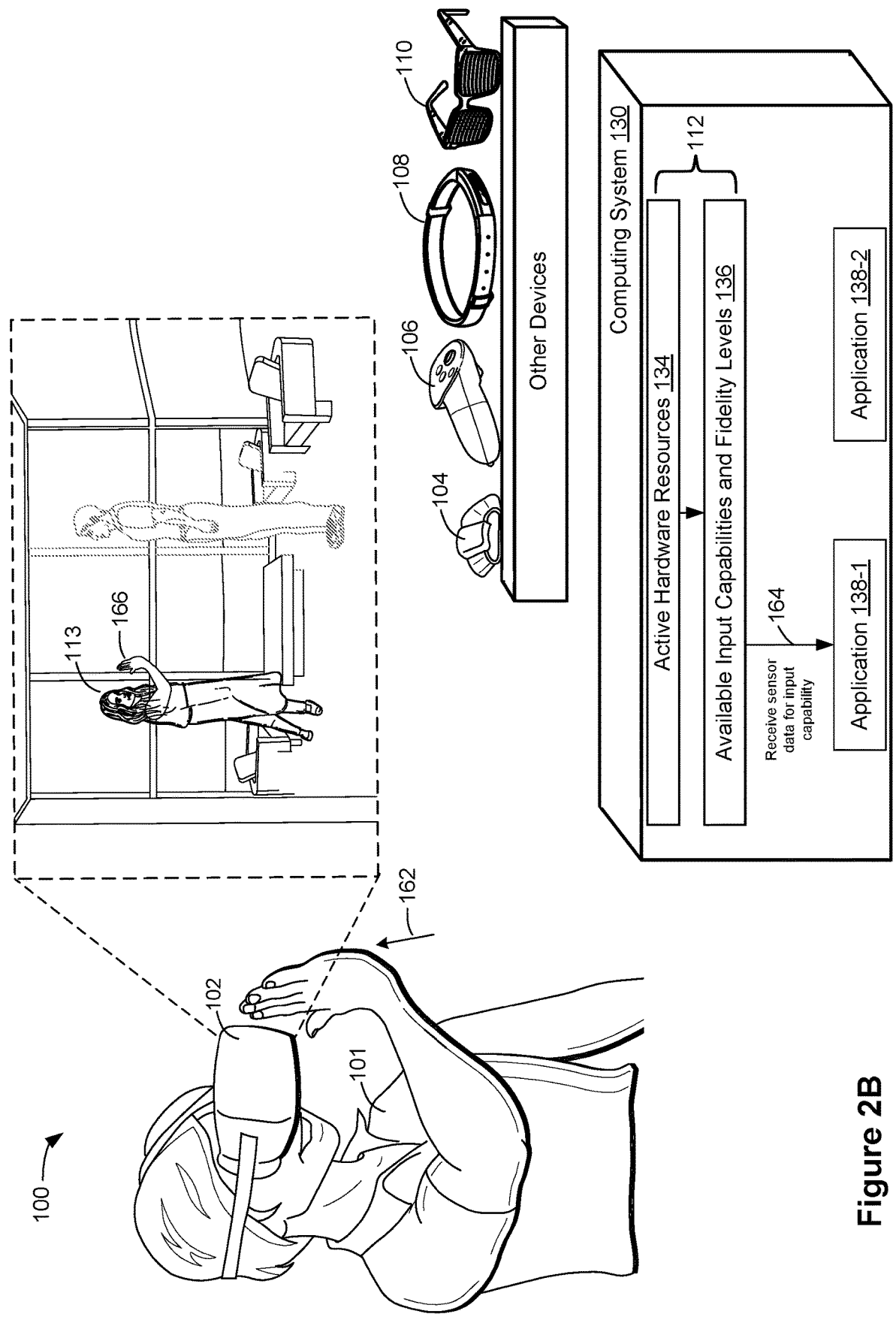

FIGS. 2A-2B illustrate another example user scenario with the artificial-reality system 100 in accordance with some embodiments. FIG. 2A shows the user 101 not wearing the wearable device 104 (e.g., the wearable device 104 is inactive). FIG. 2A further shows the application 138-1 receiving information 160 about currently available capabilities of the artificial-reality system 100 from the input framework 112. In the example of FIG. 2A, the available capabilities include being able to detect a raise-arm gesture, e.g., using sensor(s) of the head-mounted display 102. The available capabilities in FIG. 2A do not include being able to detect a wrist-shake gesture, e.g., because the sensor(s) of the head-mounted display 102 do not have the required capabilities. FIG. 2A further shows the virtual-reality scene 111 with a greetings options menu 144 including only the high five greeting 148 that corresponds to the raise-arm gesture. FIG. 2B shows the user 101 making an arm-raise gesture 162 and the input framework 112 sending corresponding sensor data 164 to the application 138-1. FIG. 2B further shows the user's avatar 113 initiating a high five 166 in accordance with the arm-raise gesture 162.

Figure 3A:
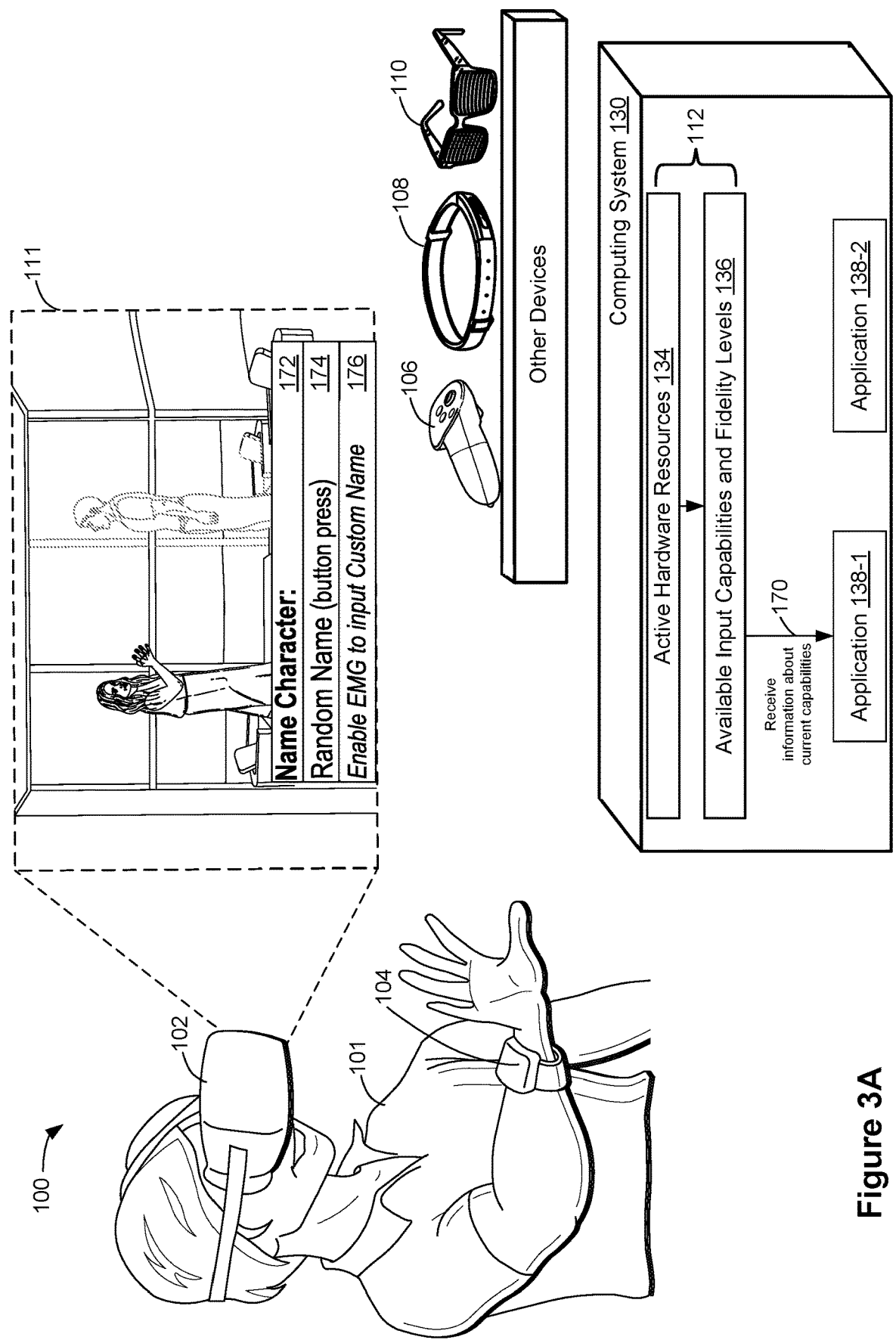
FIGS. 3A-3D illustrate another example user scenario with the artificial-reality system of FIG. 1A in accordance with some embodiments.

FIGS. 3A-3D illustrate another example user scenario with the artificial-reality system 100 in accordance with some embodiments. FIG. 3A shows the user 101 wearing the head-mounted display 102 and the wearable device 104. FIG. 3A further shows the application 138-1 receiving information 170 about currently available capabilities of the artificial-reality system 100 from the input framework 112. In the example of FIG. 3A, the available capabilities include being able to detect a button press gesture, e.g., using sensor(s) of the wearable device 104. The available capabilities in FIG. 3A do not include being able to detect typing gestures, e.g., because the electromyogram (EMG) sensor(s) of the wearable device 104 (which enable a virtual keypad for entering a name) are disabled (e.g., to preserve battery power). FIG. 3A further shows the virtual-reality scene 111 with a name character menu 172 including a random name option 174 that corresponds to the button press gesture, and a custom name option 176 that is disabled due to EMG capabilities being disabled.

Figure 3B:
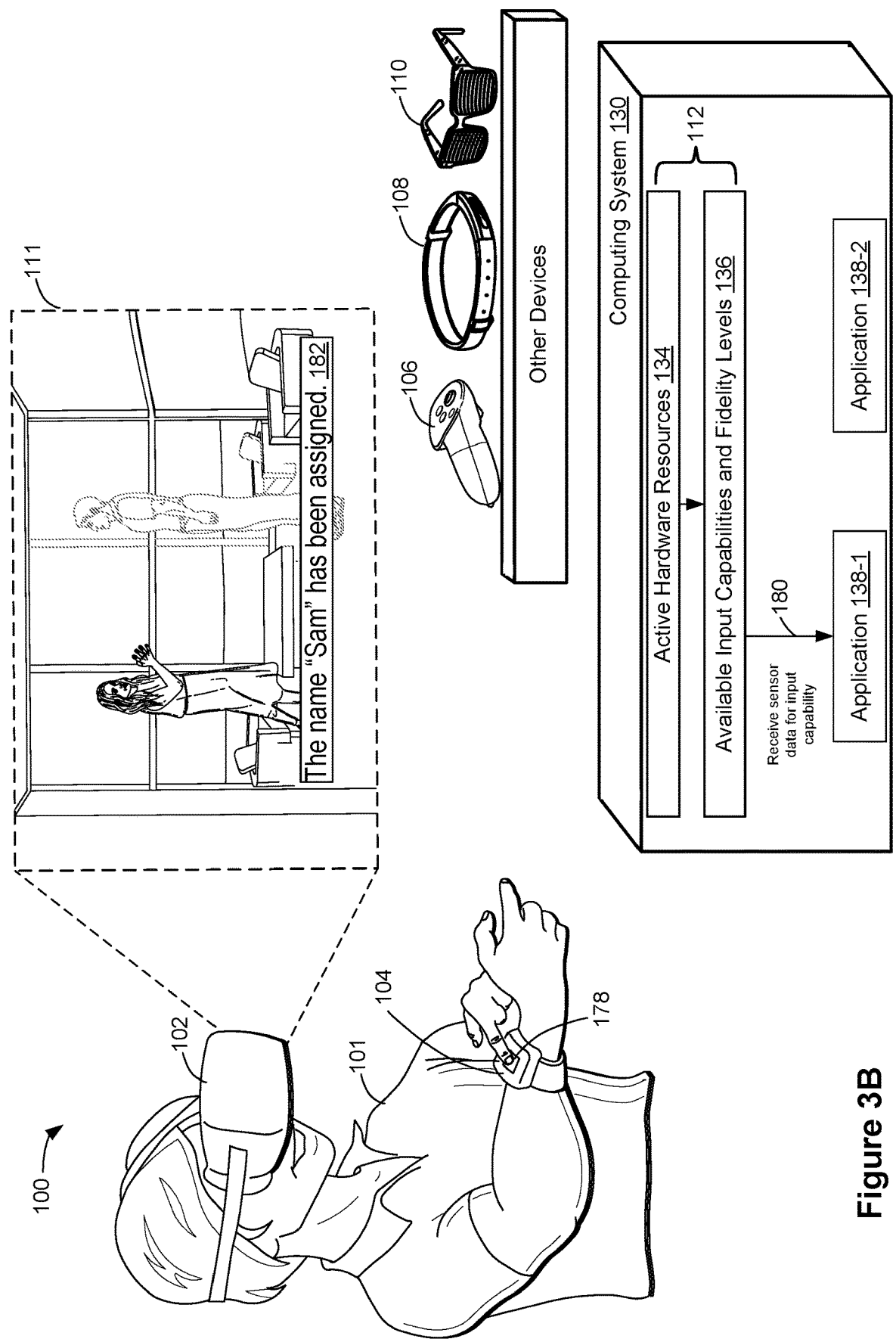

FIG. 3B shows the user 101 making a button press gesture 178 using the wearable device 104 and the input framework 112 sending corresponding sensor data 180 to the application 138-1. FIG. 3B further shows a notification 182 in the scene 111 that a random name of "Sam" has been assigned in accordance with the button press gesture 178.

Figure 3C:
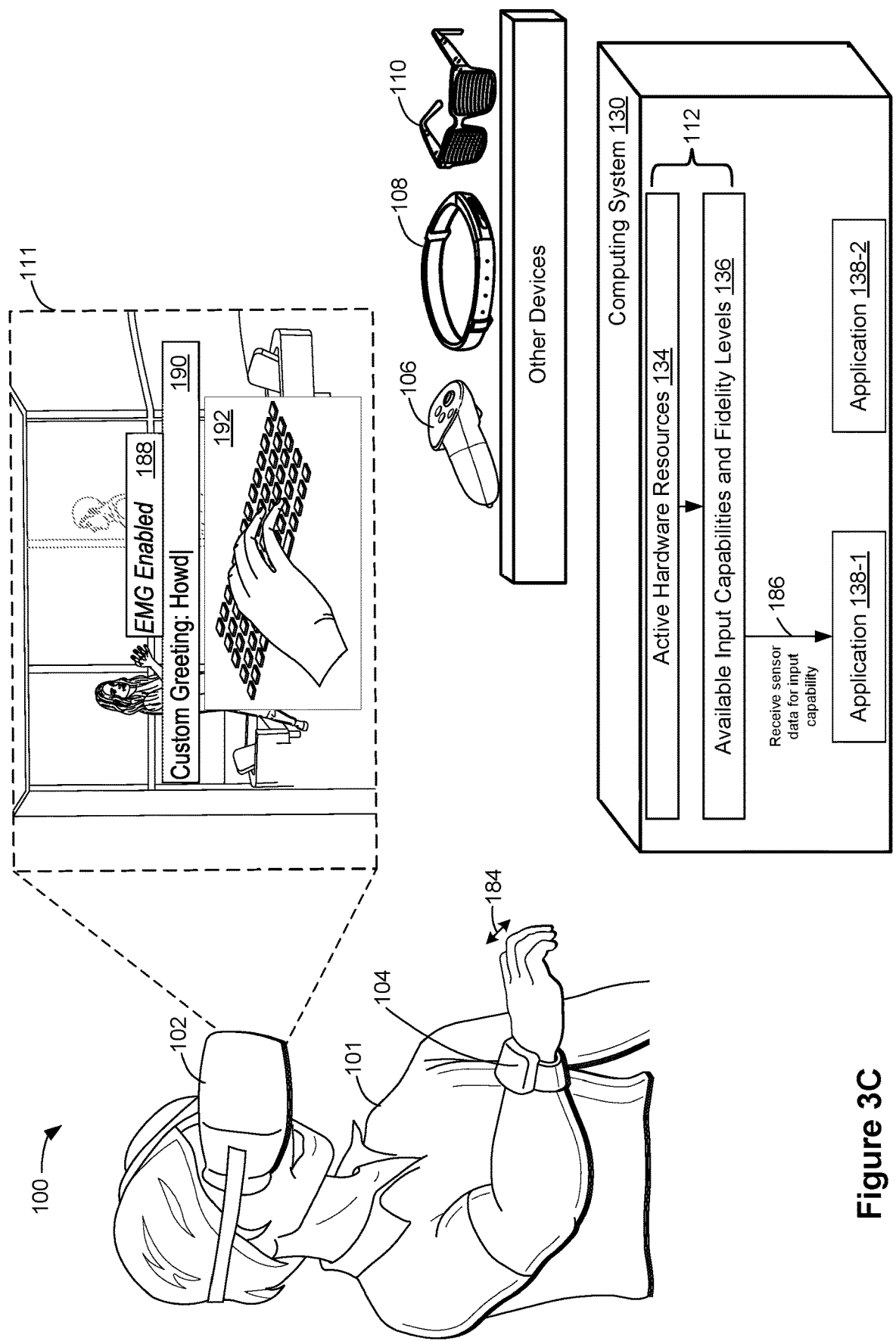

In the example of FIG. 3C the EMG capabilities of the wearable device 104 are enabled, as denoted by the notification 188 in the scene 111. FIG. 3C shows the user 101 making typing gestures 184 using the wearable device 104 and the input framework 112 sending corresponding sensor data 186 to the application 138-1. FIG. 3C further shows a virtual keyboard 192 displayed to the user 101 and a partial custom greeting 190 shown assigned in accordance with the typing gestures 184.

Figure 3D:
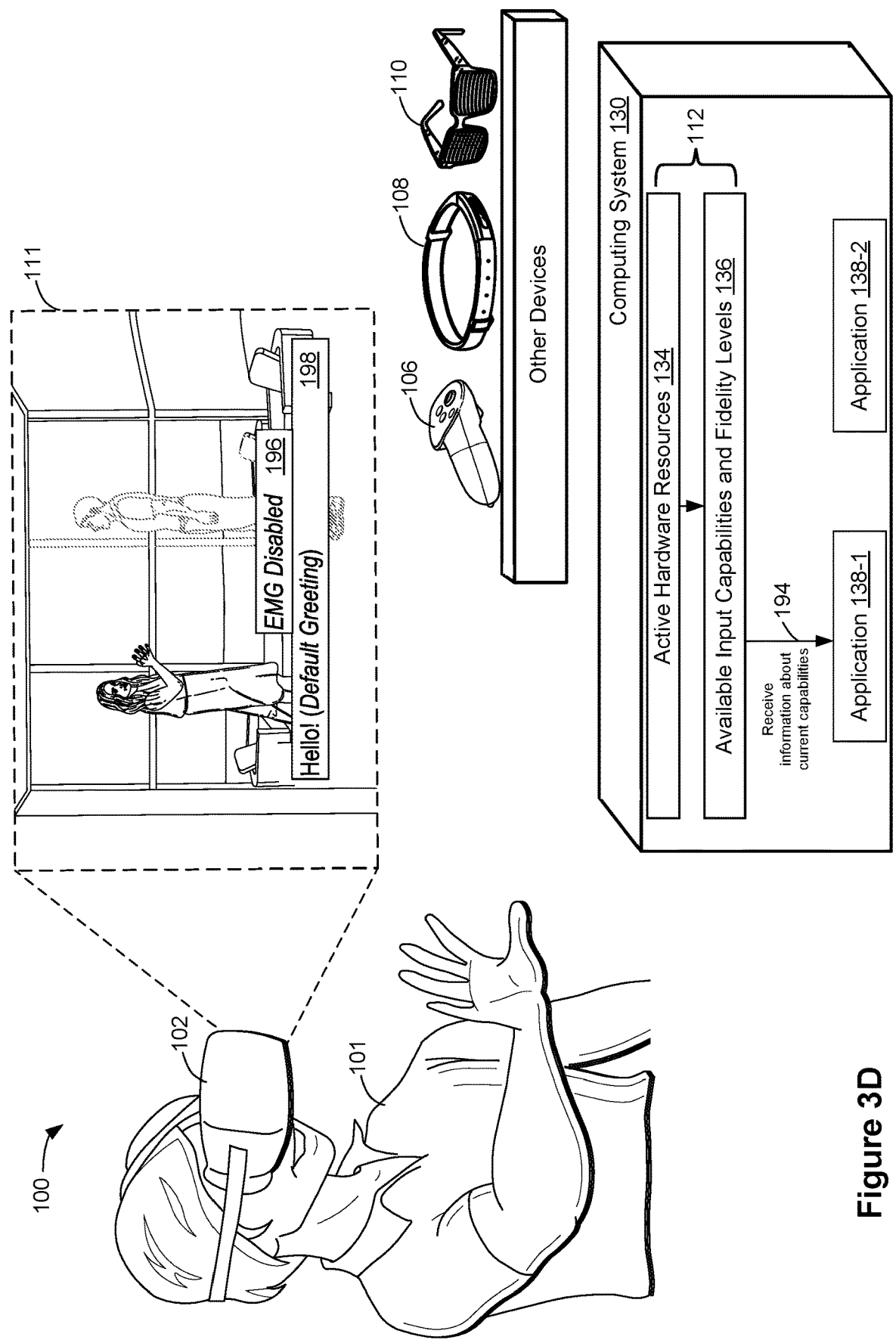

In the example of FIG. 3D, the EMG capabilities of the wearable device 104 are disabled, as denoted by the notification 196 in the scene 111. FIG. 3D shows the input framework 112 sending information 194 about the available capabilities to the application 138-1 (e.g., information about the lack of EMG capabilities). FIG. 3D further shows a default greeting 198 used in the virtual scene 111 assigned in accordance with the information 194. In the example of FIG. 3D, the default greeting 198 is used automatically in accordance with the application 138-1 determining that no capabilities are active for custom greetings. In some embodiments, the application 138-1 displays a notification to the user that custom greetings are disabled. In some embodiments, the application 138-1 receives information from the input framework 112 regarding additional sensor(s) or devices that could be enabled to allow for custom greetings (e.g., in response to a query from the application 138-1 to the input framework 112). In some embodiments, the application 138-1 prompts the user to enable one or more additional sensor(s) to allow for custom greetings within the virtual-reality environment.

Figure 4A:
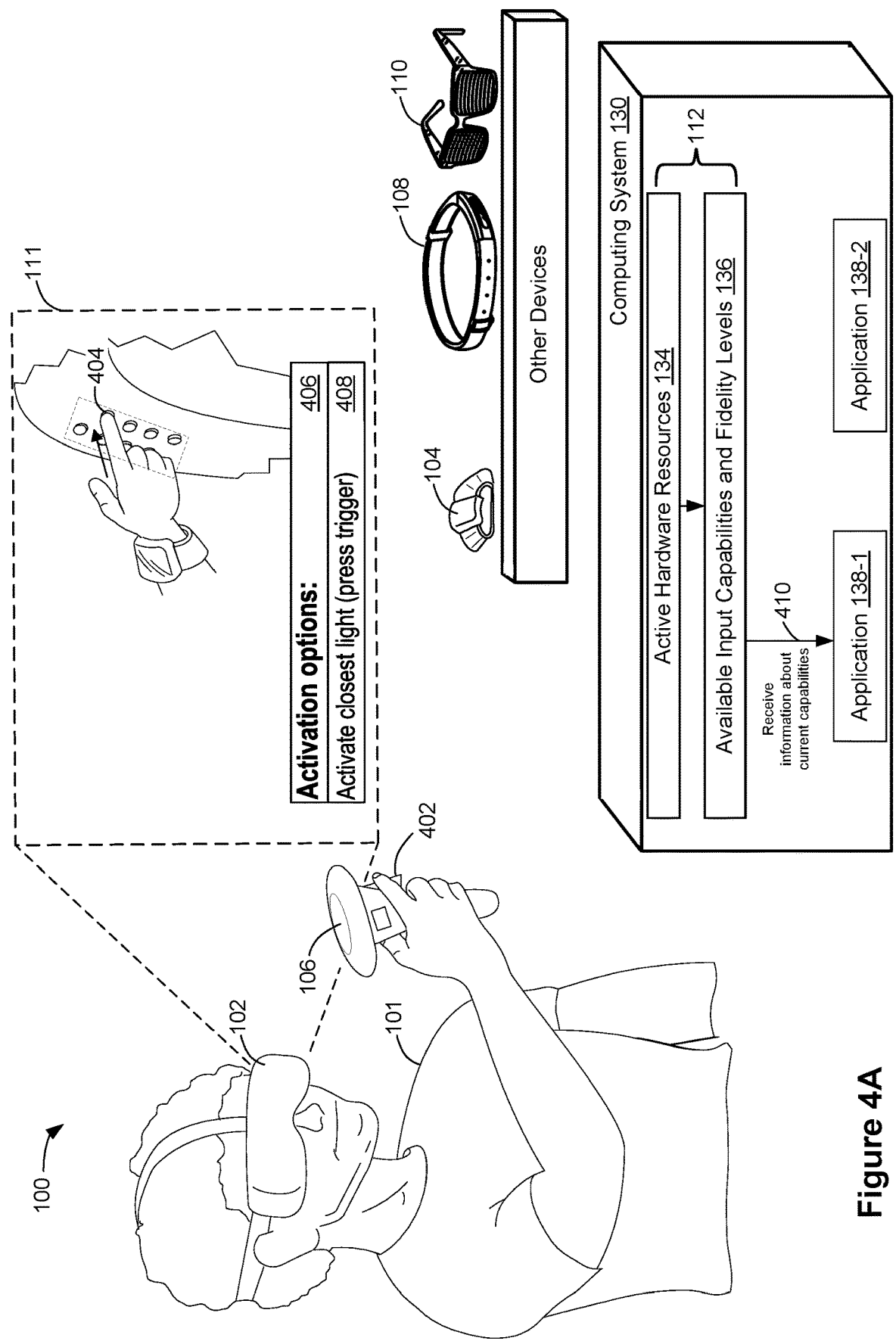
FIGS. 4A-4B illustrate another example user scenario with the artificial-reality system of FIG. 1A in accordance with some embodiments.
Figure 4B:
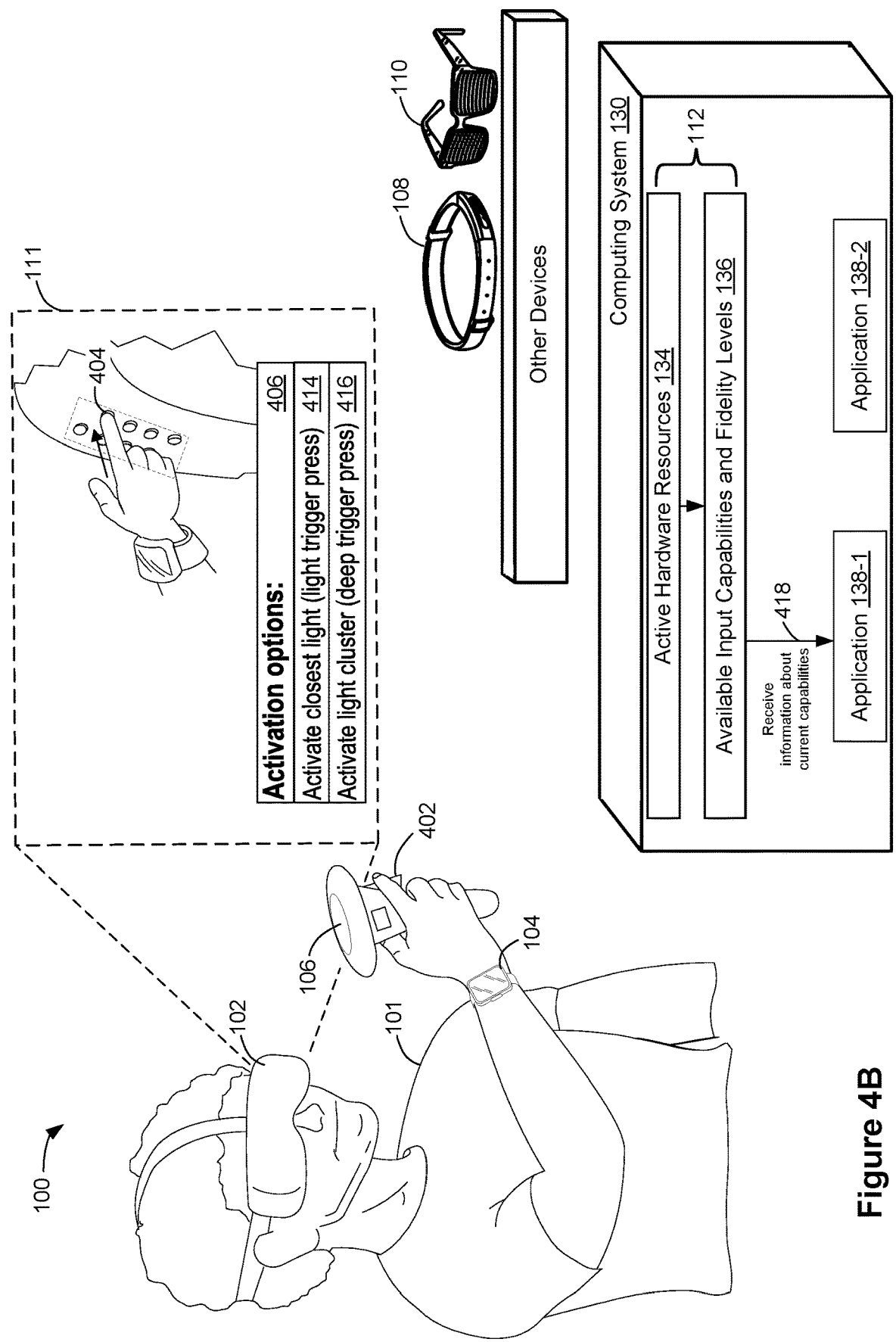

FIGS. 4A-4B illustrate another example user scenario with the artificial-reality system of FIG. 1A in accordance with some embodiments. FIG. 4A shows the user 101 wearing the head-mounted display 102 and holding the controller device 106 having a button 402 (e.g., a mechanical button). FIG. 4A further shows the application 138-1 receiving information 418 about currently available capabilities of the artificial-reality system 100 from the input framework 112. In the example of FIG. 4A, the available capabilities include being able to detect activation of the button 402 using sensor(s) of the controller device 106. The available capabilities in FIG. 4A do not include being able to detect an amount of force being used to activate the button 402, e.g., because the controller device 106 does not include a force sensor for the button 402. FIG. 4A further shows the virtual-reality scene 111 with a virtual button 404 and an activation menu 406 including an option 408 to activate a closest light (e.g., a virtual light closest to the virtual 404) that corresponds to activation of the button 402. The activation menu 406 in FIG. 4A does not include options for force-based activation of the button 402 as the available capabilities do not include force sensing for the button 402.

FIG. 4B shows the user 101 wearing the head-mounted display 102 and the wearable device 104 (e.g., a smartwatch or bracelet), and holding the controller device 106 having the button 402. FIG. 4B further shows the application 138-1 receiving information 418 about currently available capabilities of the artificial-reality system 100 from the input framework 112. In the example of FIG. 4B, the available capabilities include being able to detect activation of the button 402 using sensor(s) of the controller device 106. The available capabilities in FIG. 4B further include being able to detect an amount of force being used to activate the button 402, using one or more electromyography (EMG) sensors associated with the wearable device 104. In accordance with some embodiments, the EMG sensor(s) are configured to detect an amount of force being exerted by digits of the user's hand (e.g., detect an amount of force applied to the button 402). FIG. 4B further shows the virtual-reality scene 111 with the virtual button 404 and the activation menu 406 including an option 414 to activate the closest light that corresponds to a light-force activation of the button 402 (e.g., activation of the button 402 with a corresponding force that is less than a preset threshold). The activation menu 406 in FIG. 4B further includes an option 416 to activate a cluster of lights (e.g., all of the lights in a virtual room) that corresponds to a deep-force activation of the button 402 (e.g., activation of the button 402 with a corresponding force that is greater than the preset threshold).

Figure 5A:
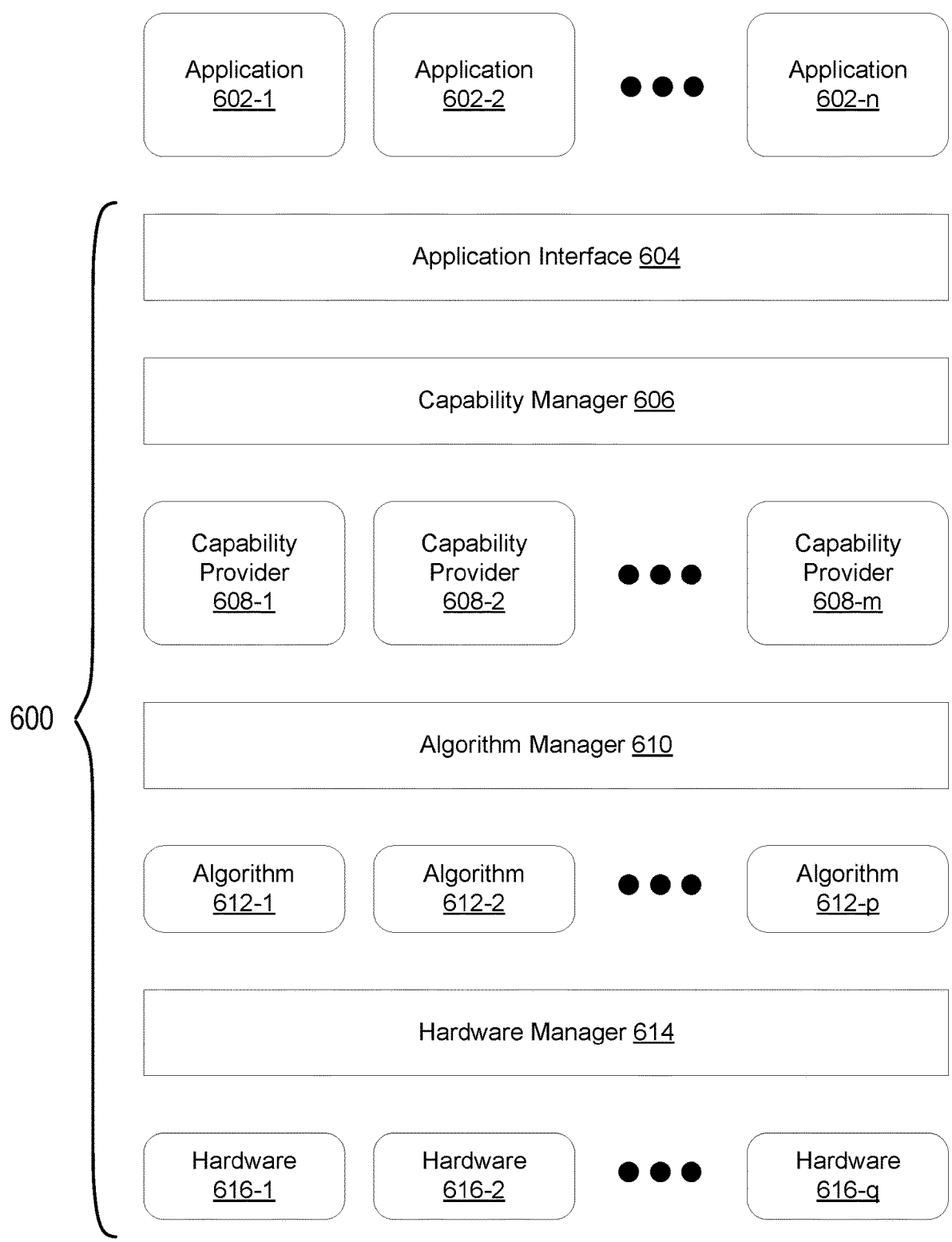
FIG. 5A is a block diagram of an example input framework in accordance with some embodiments.

FIG. 5A is a block diagram of an input framework 600 in accordance with some embodiments. In some embodiments, the input framework 600 is implemented in an artificial-reality system, e.g., implemented on the computing system 130 or the computer system 272. In some embodiments, the input framework 600 is the input framework 112. The input framework 600 includes a plurality of hardware resources 616 (e.g., hardware resources 616-1, 616-2, and 616-$q$). Examples of hardware resources includes a GPU, a head-mounted camera, a head-mounted IMU, a wrist-mounted IMU, a controller IMU, and an external camera. The input framework 600 further includes a hardware manager 614 configured to activate and deactivate the hardware resources 616 based on capability needs. In some embodiments, the hardware manager 614 is configured to handle hardware resource 616 availability changes (e.g., due to power, heat, and privacy constraints). In some embodiments, the hardware manager 614 is configured to adjust operation of the hardware resources 616 based on requests from other components of the input framework 600 (e.g., the algorithms 612, the algorithm manager 610, and/or the capability manager 606). In some embodiments, the hardware manager 614 is configured to adjust operation of one or more sensors on the hardware resources 616. In some embodiments, the hardware manager 614 is configured to communicate with the algorithm manager 610 and/or the capability manager 606 to identify appropriate settings for the hardware resources 616 (e.g., low power settings when higher power capabilities are not required).

As an illustrative example, a computer-vision based hand tracking capability may require headset cameras to run at 60 hertz with exposure of 10 milliseconds, while computer-vision based controller tracking may require the same cameras to run at 30 hertz with exposure of 1 millisecond. In this example, if the user switches from using a controller tracking capability to hand tracking capability, the hardware manager 614 updates the sampling rate and exposure time of the headset cameras accordingly. To continue the example, if both hand tracking and controller tracking are requested and there is a way to support the two capabilities, then the hardware manager 614 updates the sensors accordingly. For example, by using a different hand-tracking algorithm that uses a lower rate and shorter exposure; or by operating the cameras at 60 hertz and 1 millisecond settings, and then artificially downsampling and/or enhancing the images before forwarding them to the algorithm; or by using one of the cameras for hand tracking, and another of the cameras for controller tracking. In some embodiments, the hardware manager 614 communicates with the algorithm manager 610 and/or the capability manager 606 to identify and implement the appropriate hardware resource (sensor) settings. To continue the previous example, if both hand tracking and controller tracking are requested and there is not a way to support the two capabilities, the hardware manager initiates an error message, and may suggest (e.g., via capability manager) using only one of the capabilities.

The input framework 600 also includes a plurality of algorithms 612 (e.g., algorithms 612-1, 612-2, and 616-$p$) for generating outputs for one or more application capabilities. In some embodiments, the algorithms 612 generate outputs at multiple fidelity levels. In some embodiments, the algorithms 612 are executed as microservices which consume hardware resources (e.g., compute and measurement resources) independently from one another. The input framework 600 further includes an algorithm manager 610 configured to activate and deactivate the algorithms 612 based on capability needs. In some embodiments, the algorithm manager 610 is configured to generate a notification (e.g., to a user and/or an application 602) in accordance with an algorithm 612 failing due to a change in hardware availability.

The input framework 600 also includes a plurality of capability providers 608 (e.g., capability providers 608-1, 608-2, and 608-$m$) for generating output for a specific capability using outputs from one or more of the algorithms 612. In some embodiments, the capability providers 608 output a capability at a highest available fidelity level. In some embodiments, the capability providers 608 output a capability at a minimum fidelity level. In some embodiments, if an algorithm 612 stops working (e.g., because its dependent hardware resource 616 is no longer available) the capability provider 608 using output from the algorithm 612 requests a replacement algorithm from the algorithm manager 610. The input framework 600 also includes a capability manager 606 configured to activate and deactivate the capability providers 608 based on application needs. In some embodiments, the capability manager 606 provides a warning (e.g., to a user and/or an application 602) in accordance with a capability not being available, or not being available at a minimum fidelity level requested by an application 602. In some embodiments, if a replacement algorithm is not found, the capability provider 608 notifies the capability manager 606. The input framework 600 also includes an application interface 604 configured to interface with a plurality of applications 602 (e.g., the applications 602-1, 602-2, or 602-$n$), e.g., to offer capability and fidelity enumeration and registration for the applications 602.

Figure 5B:
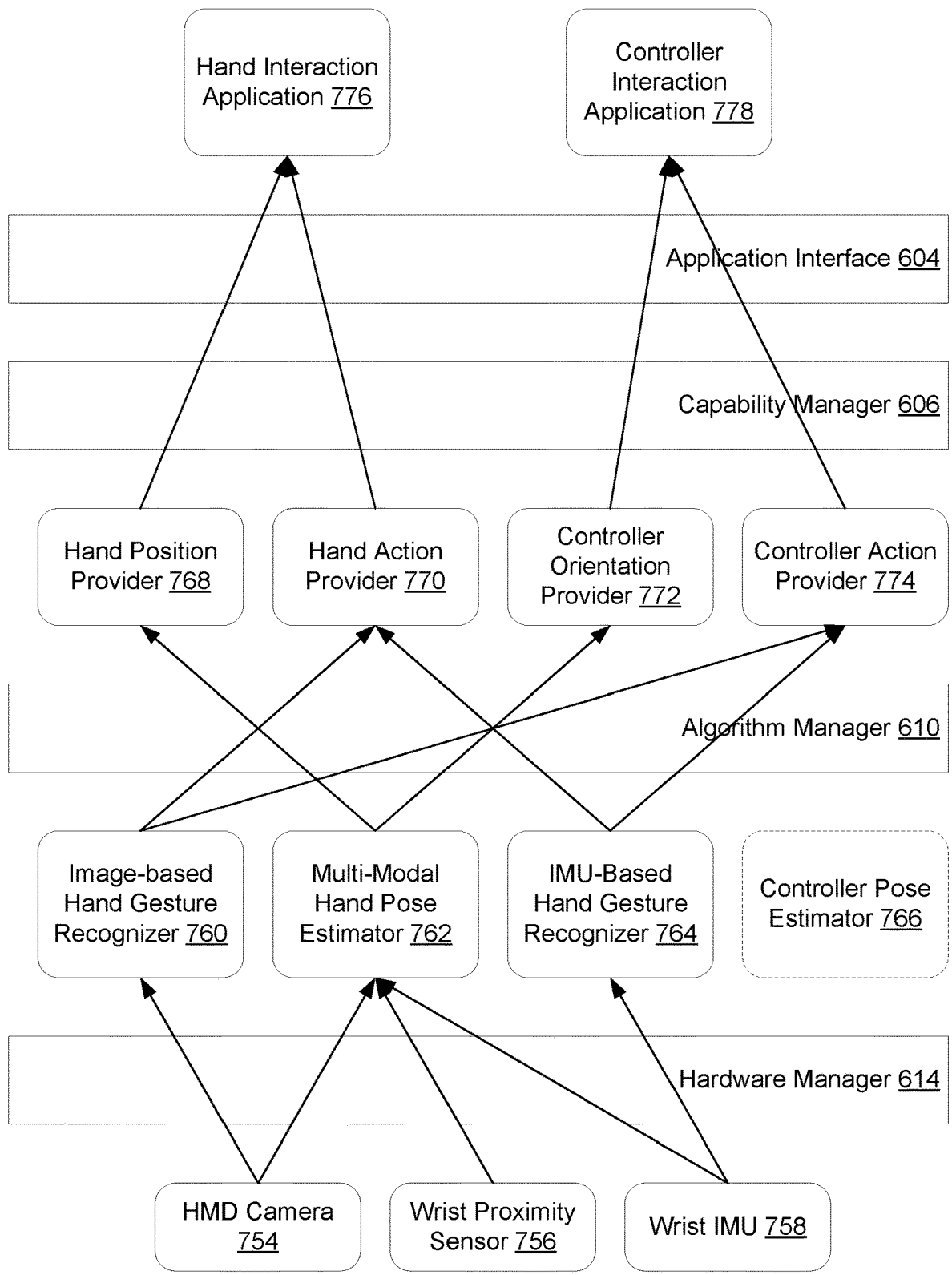
FIG. 5B is a block diagram of an example mapping using the example input framework of FIG. 5A in accordance with some embodiments.

FIG. 5B is a block diagram of an example capability mapping using the input framework 600 in accordance with some embodiments. In the example of FIG. 5B, an artificial-reality system includes a head-mounted display (e.g., the head-mounted display 210) and a smartwatch (e.g., the wearable device 220). The head-mounted display in this example includes a camera 754. The smartwatch in this example includes an IMU and a proximity sensor. As shown in FIG. 5B, two applications are active, a hand interaction application 776 and a controller interaction application 778. For example, the hand interaction application 776 allows a user to interact with virtual objects via a hand interaction paradigm (e.g., by grabbing and dragging them). The hand interaction application 776 requires a high-fidelity position capability and a low-fidelity action capability. For example, the controller interaction application 778 allows a user to interact with virtual objects via a controller interaction paradigm (e.g., point and click interaction). The controller interaction application 778 requires a medium-fidelity position capability and a medium-fidelity action capability.

In the example of FIG. 5B, the hand interaction application 776 communicates with the application interface 604 to request a high-fidelity hand position capability and a low-fidelity hand action capability. The controller interaction application 778 communicates with the application interface 604 to request a medium-fidelity controller orientation capability and a medium-fidelity controller action capability. The application interface 604 requests the capabilities with corresponding fidelities from the capability manager 606. In response, the capability manager 606 activates four capabilities: the hand position provider 768, the hand action provider 770, the controller orientation provider 772, and the controller action provider 774.

The hand position provider 768 subscribes to a multi-modal hand pose estimator algorithm 762. In this example, the multi-modal hand pose estimator algorithm 762 is capable of providing hand position and orientation at high, medium, and low fidelity. The hand action provider 770 subscribes to an image-based hand gesture recognizer algorithm 760 and an IMU-based hand gesture recognizer algorithm 764. In this example, the image-based hand gesture recognizer algorithm 760 is capable of providing hand action at medium and low fidelity; and the IMU-based hand gesture recognizer algorithm 764 is capable of providing hand action at medium and low fidelity.

In the example of FIG. 5B, a controller pose estimator algorithm 766 is not available (e.g., because no controller hardware resources are active). Therefore, the controller orientation provider 772 subscribes to the multi-modal hand pose estimator algorithm 762, as the controller orientation provider 772 in this example is capable of converting hand orientation to orientation of a virtual controller. Similarly, the controller action provider 774 subscribes to the image-based hand gesture recognizer algorithm 760 and an IMU-based hand gesture recognizer algorithm 764, as the controller action provider 774 in this example is capable of converting hand action to action of a virtual controller.

The algorithm manager 610 analyzes the subscriptions and requested fidelity levels. The algorithm manager 610 in this example activates the multi-modal hand pose estimator algorithm 762 and image-based hand gesture recognizer algorithm 760, while leaving the IMU-based hand gesture recognizer algorithm 764 deactivated. In this way, the HMD camera 754 is required to be active and the wrist proximity sensor 756 and wrist IMU 758 can be deactivated (e.g., thereby keeping the smartwatch in a low-power mode for battery savings).

In response to the algorithm manager 610 activating the algorithms, the hardware manager 614 activates the HMD camera 754 and directs the camera images to the image-based hand gesture recognizer algorithm 760 and the multi-modal hand pose estimator algorithm 762. The hand action and hand poses are then sent to the corresponding providers, which communicate them to the applications via the application interface 604.

To continue the example of FIG. 5B, assume that at some point the user turns off the HMD camera (e.g., due to privacy concerns). The hardware manager 614 detects the change in available hardware resources and notifies the image-based hand gesture recognizer algorithm 760 and the multi-modal hand pose estimator algorithm 762. In this example, the image-based hand gesture recognizer algorithm 760 notifies the algorithm manager 610 that it can no longer function; and the multi-modal hand pose estimator algorithm notifies the algorithm manager 610 that it can no longer provide high-fidelity hand poses, but could output medium-fidelity hand poses by using data from the wrist IMU 758 and the wrist proximity sensor 756. In response, the algorithm manager 610 deactivates the image-based hand gesture recognizer algorithm 760 and activates the IMU-based hand gesture recognizer algorithm 764. The algorithm manager 610 also requests the hardware manager 614 to turn on the wrist proximity sensor 756 and the wrist IMU 758. The algorithm manager 610 also notifies the providers (e.g., the hand action provider 770 and the controller action provider 774) about the change in capabilities and associated fidelities.

To continue the example of FIG. 5B, the hand position provider 768 determines that only medium-fidelity hand position is available, but high-fidelity hand position capability was requested by the hand interaction application 776. The hand position provider 768 notifies the capability manager 606 of the inability to provide high-fidelity hand position. The hand action provider 770 continues to be active as low-fidelity hand action is available via the IMU-based hand gesture recognizer algorithm 764. Likewise, the controller orientation provider 772 continues to be active as medium-fidelity controller orientation is available via the multi-modal hand pose estimator algorithm 762 (e.g., using data from the wrist proximity sensor 756 and the wrist IMU 758). Similarly, the controller action provider continues to be active as medium-fidelity controller action is available via the IMU-based hand gesture recognizer algorithm 764.

To continue the example of FIG. 5B, the capability manager 606 notifies the hand interaction application 776 about the inability to provide high-fidelity hand position capability. The hand interaction application 776 may present the user with various remedies: (i) stop using the application because the original input paradigm is no longer available, (ii) continue using the application, but switch to a different input paradigm, or (iii) continue using the application, but enable certain hardware resources (e.g., a list provided by the input framework 600). The controller interaction application 778, on the other hand, could continue to operate as the input framework 600 handles the change in hardware resources while maintaining the requested capabilities and fidelities.

Figure 5C:
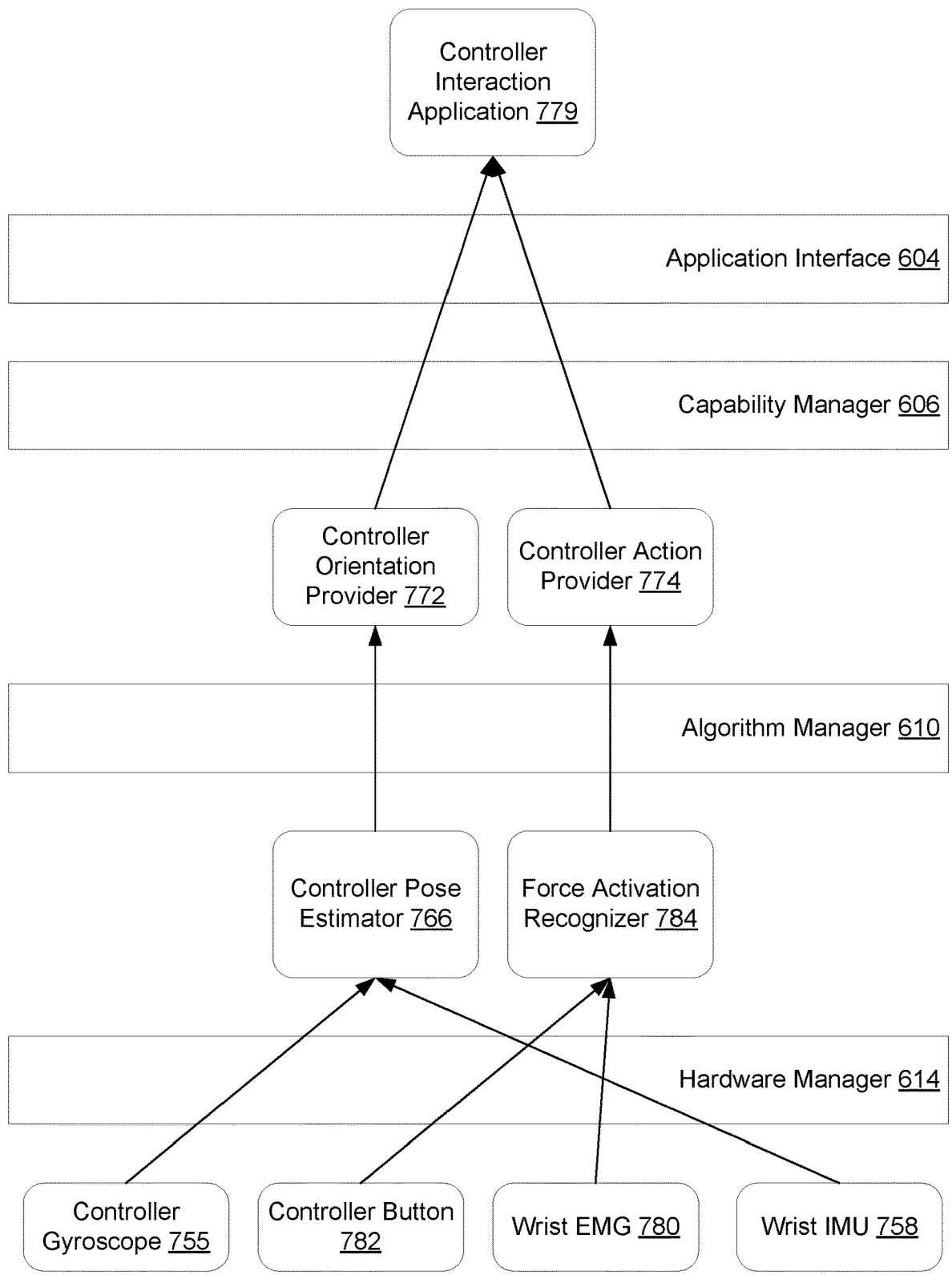
FIG. 5C is a block diagram of another example mapping using the example input framework of FIG. 5A in accordance with some embodiments.

FIG. 5C is a block diagram of another example mapping using the input framework 600 of FIG. 5A in accordance with some embodiments. In the example of FIG. 5C, an artificial-reality system includes a smartwatch (e.g., the wearable device 220) and a controller (e.g., the controller device 106). The controller in this example includes a gyroscope and a mechanical button. The smartwatch in this example includes an IMU sensor and an EMG sensor. As shown in FIG. 5C, one application is active, a controller interaction application 779. For example, the controller interaction application 779 allows a user to interact with virtual objects via a controller interaction paradigm (e.g., point and click interaction). The controller interaction application 779 requires a medium-fidelity orientation capability and a medium-fidelity force action capability.

In the example of FIG. 5C, the controller interaction application 779 communicates with the application interface 604 to request a medium-fidelity orientation capability and a medium-fidelity force action capability. The application interface 604 requests the capabilities with corresponding fidelities from the capability manager 606. In response, the capability manager 606 activates two capabilities: the controller orientation provider 772 and the controller action provider 774.

In the example of FIG. 5C, the controller orientation provider 772 subscribes to a controller pose estimator algorithm 766. In this example, the controller pose estimator algorithm 766 is capable of providing controller position and orientation at high, medium, and low fidelity. The controller action provider 774 subscribes to a force activation recognizer algorithm 784. In this example, the force activation recognizer algorithm 784 is capable of providing controller force activation action at medium and low fidelity.

The algorithm manager 610 analyzes the subscriptions and requested fidelity levels. The algorithm manager 610 in this example activates the controller pose estimator algorithm 766 and the force activation recognizer algorithm 784. In response to the algorithm manager 610 activating the algorithms, the hardware manager 614 (optionally activates and) directs data be sent from a controller gyroscope 755 and a wrist IMU sensor 758 to the controller pose estimator algorithm 766. The controller poses are then sent to the controller orientation provider 772, which communicates them to the controller interaction application 779 via the application interface 604. The hardware manager 614 also (optionally activates and) directs data be sent from a controller button 782 and a wrist EMG sensor 780 and to the force activation recognizer algorithm 784. The force activations are then sent to the controller action provider 774, which communicates them to the controller interaction application 779 via the application interface 604.

To continue the example of FIG. 5C, assume that at some point the user takes off their smartwatch (e.g., to charge the smartwatch). The hardware manager 614 detects the change in available hardware resources and notifies the force activation recognizer algorithm 784 and the controller pose estimator algorithm 766. In this example, the force activation recognizer algorithm 7684 notifies the algorithm manager 610 that it can no longer function; and the controller pose estimator algorithm notifies the algorithm manager 610 that it can no longer provide high-fidelity controller poses, but could output medium-fidelity controller poses by using the controller gyroscope 755 without the wrist IMU 758. In response, the algorithm manager 610 deactivates the force activation recognizer algorithm 784. The algorithm manager 610 also notifies the providers (e.g., the controller orientation provider 772 and the controller action provider 774) about the change in capabilities and associated fidelities.

To continue the example of FIG. 5C, the capability manager 606 notifies the controller interaction application 779 about the inability to provide the force action capability. The controller interaction application 779 may present the user with various remedies: (i) stop using the application because the original input paradigm is no longer available, (ii) continue using the application, but switch to a different input paradigm, or (iii) continue using the application, but enable certain hardware resources (e.g., a list provided by the input framework 600).

Figure 6A:
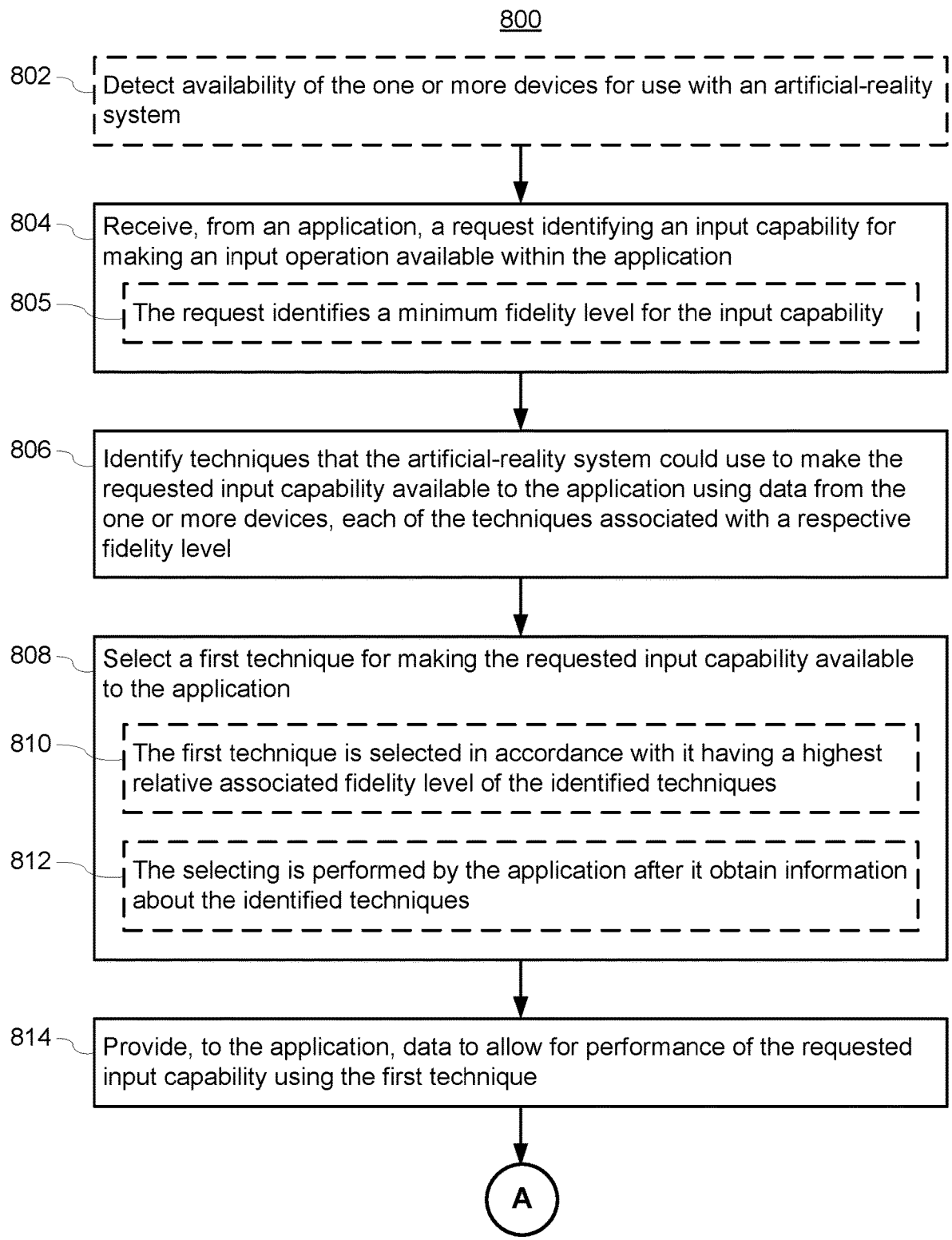
FIGS. 6A-6C show a flowchart of an example process for using a hardware-agnostic input framework in accordance with some embodiments.
Figure 6B:
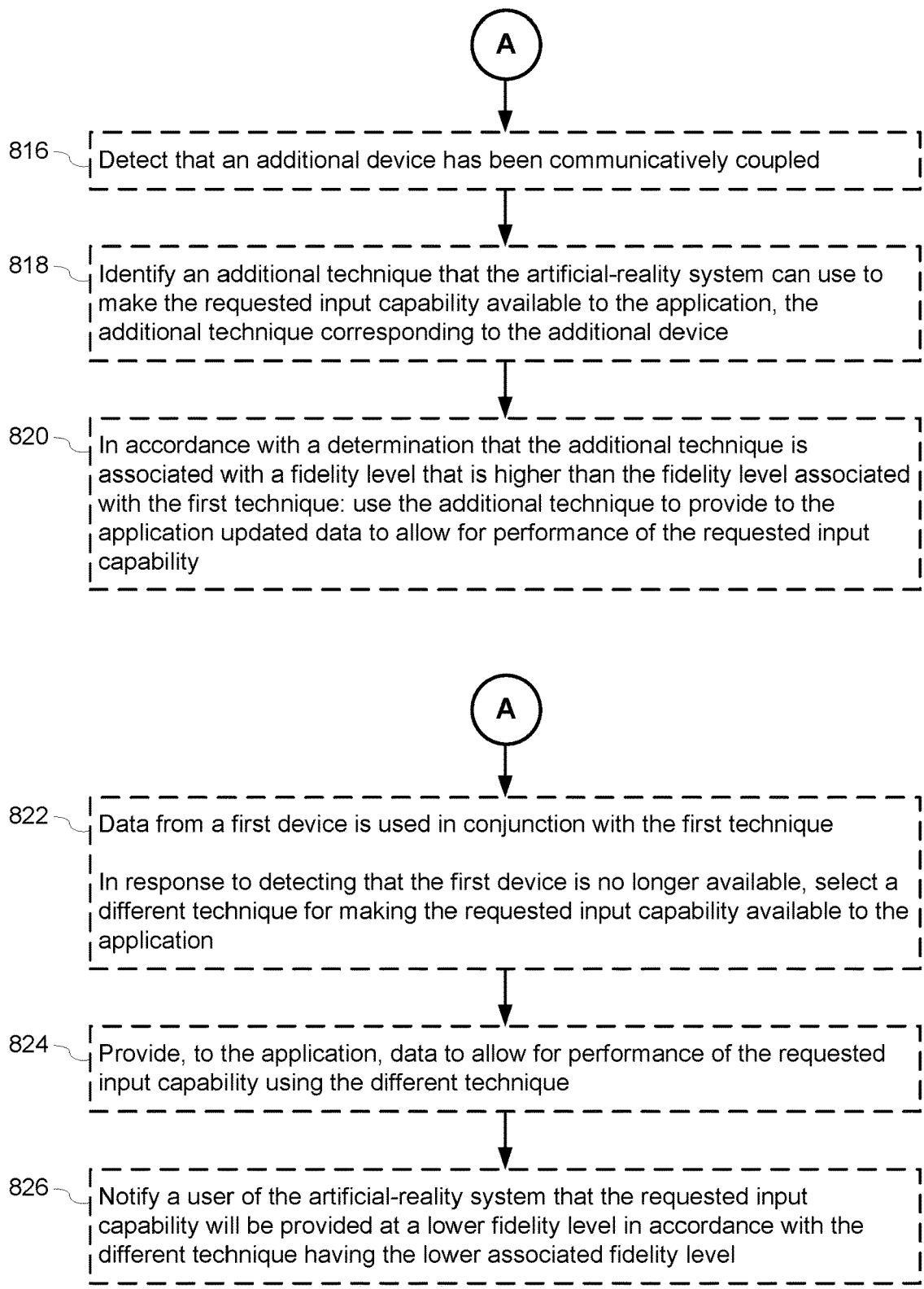
Figure 6C:
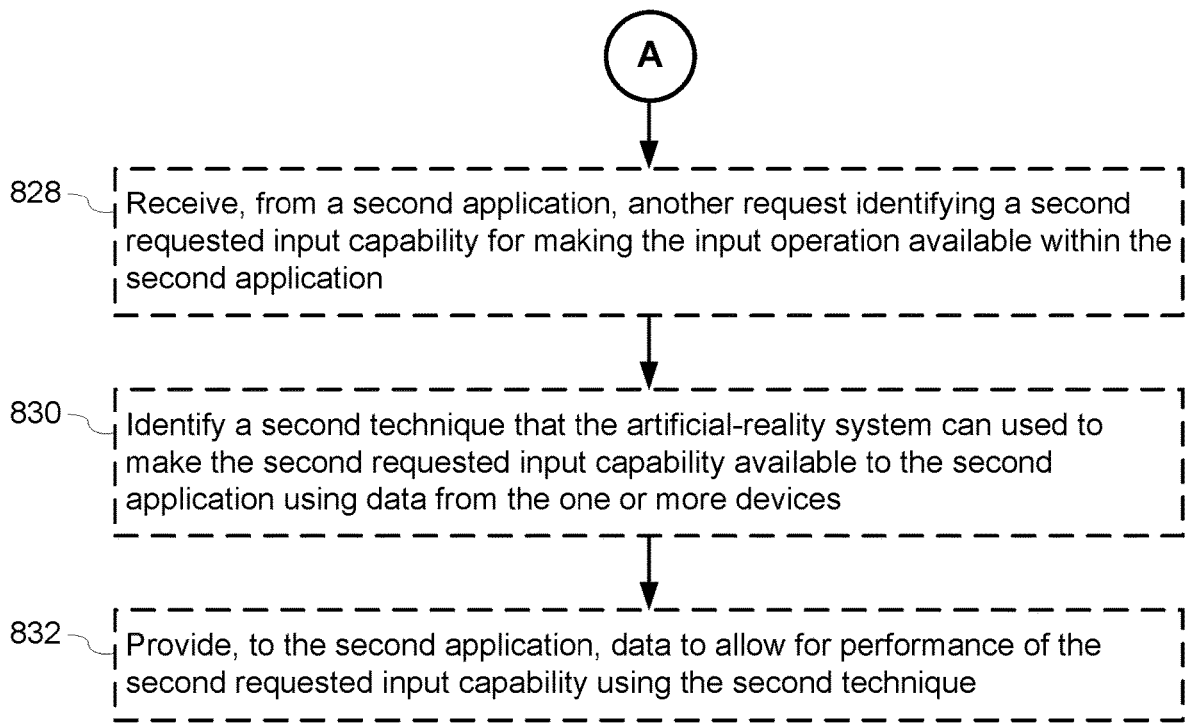

FIGS. 6A-6C are flow diagrams illustrating a method 800 for using a hardware-agnostic input framework in accordance with some embodiments. The method 800 is performed at a computing system (e.g., the computing system 130) having one or more processors and memory. In some embodiments, the memory stores one or more programs configured for execution by the one or more processors. At least some of the operations shown in FIGS. 6A-6C correspond to instructions stored in a computer memory or computer-readable storage medium (e.g., the memory 278 of the computer system 272 or the memory 256-1 of the accessory device 252-1).

In some embodiments, the computing system detects (802) availability of the one or more devices for use with an artificial-reality system. For example, the computing system 130 in FIG. 1 detects (e.g., with the hardware manager 614) the availability of the head-mounted display 102 and the wearable device 104.

The computing system receives (804), from an application, a request identifying an input capability for making an input operation available within the application. For example, FIG. 5B shows the hand interaction application 776 requesting a hand position capability and a hand action capability.

In some embodiments, the request from the application identifies (805) an input capability and a minimum required fidelity level. In some embodiments, the request includes a minimum required fidelity level and a desired fidelity level for the input capability.

The computing system identifies (806) techniques that the artificial-reality system could use to make the requested input capability available to the application using data from the one or more devices, each of the techniques associated with a respective fidelity level. For example, the input framework 600 in FIG. 5B identifies (e.g., via algorithm manager 610) the image-based hand gesture recognizer algorithm 760 and the IMU-based hand gesture recognizer algorithm 764 as available provide the hand action capability.

The computing system selects (808) a first technique for making the requested input capability available to the application. For example, the input framework 600 in the example of FIG. 5B selects the image-based hand gesture recognizer algorithm 760 to provide the hand action capability (e.g., to preserve power of the wearable device).

In some embodiments, the first technique is selected (810) in accordance with it having the highest relative associated fidelity level of the identified techniques. For example, the IMU-based hand gesture recognizer algorithm 764 is selected in some scenarios due to it allowing for high-fidelity hand action capability, whereas the HMD camera may only allow for medium-fidelity hand action capability.

In some embodiments, the selecting is performed (812) by the application after it obtain information about the identified techniques. For example, the capability manager 606 informs the hand interaction application 776 of the identified techniques and associated fidelity levels and the hand interaction application 776 selects the image-based hand gesture recognizer algorithm 760.

The computing system provides (814), to the application, data to allow for performance of the requested input capability using the first technique. For example, the hand action provider 770 provides hand action data to the hand interaction application 776.

In some embodiments, the computing system detects (816) that an additional device has been communicatively coupled. For example, the computing system 130 detects that the controller device 106 has been communicatively coupled.

In some embodiments, the computing system identifies (818) an additional technique that the artificial-reality system can use to make the requested input capability available to the application, the additional technique corresponding to the additional device. For example, the computing system 130 identifies that the controller pose estimator algorithm 766 is available for the controller orientation capability.

In some embodiments, the computing system uses (820) an additional technique to provide to the application updated data to allow for performance of the requested input capability in accordance with a determination that the additional technique is associated with a fidelity level that is higher than the fidelity level associated with the first technique. For example, the controller pose estimator algorithm 766 provides controller orientation capability with a high fidelity and the computing system 130 use that algorithm over the multi-modal hand pose estimator algorithm 762.

In some embodiments: data from a first device is used in conjunction with the first technique; and, in response to detecting that the first device is no longer available, the computing system selects (822) a different technique for making the requested input capability available to the application. For example, in accordance with a user turning off the controller device 106, the controller pose estimator algorithm 766 is replaced with the multi-modal hand pose estimator algorithm 762.

In some embodiments, the computing system provides (824), to the application, data to allow for performance of the requested input capability using the different technique. For example, the input framework 600 provides data from the multi-modal hand pose estimator algorithm 762 in place of the controller pose estimator algorithm 766.

In some embodiments, the computing system notifies (826) a user of the artificial-reality system that the requested input capability will be provided at a lower fidelity level in accordance with the different technique having the lower associated fidelity level. For example, a user disables the HMD camera 754, which provided high-fidelity hand position capability and the user is informed that they can continue with medium-fidelity hand position capability (e.g., using the wrist IMU 758).

In some embodiments, the computing system receives (828), from a second application, another request identifying a second requested input capability for making the input operation available within the second application. For example, the computing system 130 receives a request from the controller interaction application 778 to provide controller action capability.

In some embodiments, the computing system identifies (830) a second technique that the artificial-reality system can used to make the second requested input capability available to the second application using data from the one or more devices. For example, the computing system 130 identifies the IMU-based hand gesture recognizer algorithm 764 as usable to provide the controller action capability.

In some embodiments, the computing system provides (832), to the second application, data to allow for performance of the second requested input capability using the second technique. For example, FIG. 5B shows the input framework 600 providing capabilities to the hand interaction application 776 and the controller interaction application 778.

Figure 7:
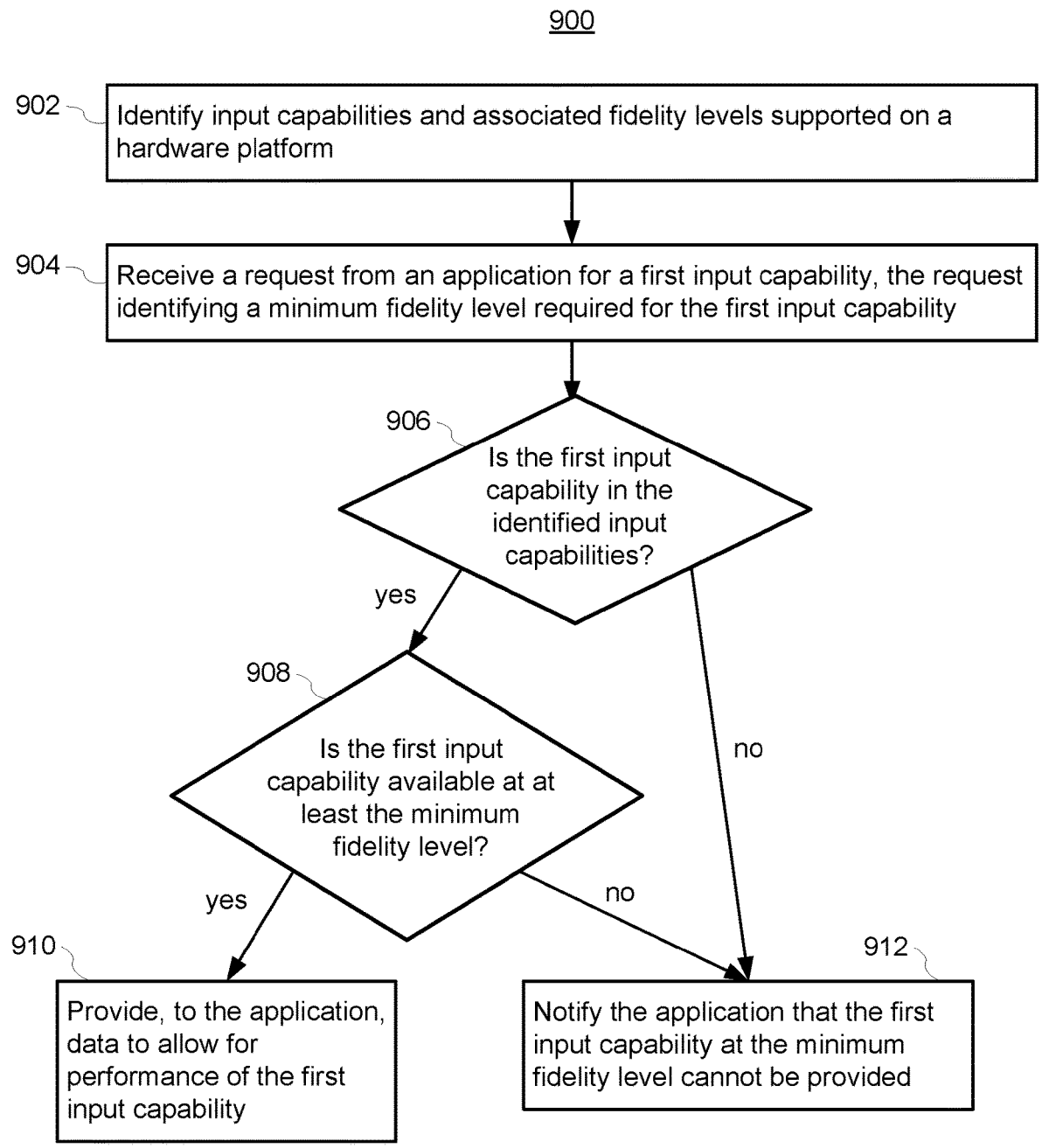
FIG. 7 shows a flowchart of an example process for using a hardware-agnostic input framework in accordance with some embodiments.

FIG. 7 is a flow diagram illustrating a method 900 for using a hardware-agnostic input framework in accordance with some embodiments. The method 900 is performed at a computing system (e.g., the computing system 130) having one or more processors and memory. In some embodiments, the memory stores one or more programs configured for execution by the one or more processors. At least some of the operations shown in FIG. 7 correspond to instructions stored in a computer memory or computer-readable storage medium (e.g., the memory 278 of the computer system 272 or the memory 256 of the accessory device 252).

The computing system identifies (902) input capabilities and associated fidelity levels supported on a hardware platform. For example, the input framework 600 identifies the HMD camera 754, the wrist proximity sensor 756, and the wrist IMU 758.

The computing system receives (904) a request from an application for a first input capability, the request identifying a minimum fidelity level required for the first input capability. For example, the input framework 600 receives a request from the hand interaction application 776 for a hand position capability at high fidelity. In some embodiments, the fidelity levels are in a range of zero to one (e.g., a normalized range) and the request from the application identifies a minimum value for the fidelity (e.g., at least 0.5, 0.7, or 0.9). In some embodiments, a high fidelity corresponds to a fidelity level of 0.9 or above, a medium fidelity corresponds to a fidelity level of 0.7 to 0.9, and a low fidelity corresponds to less than 0.7.

The computing system determines (906) whether the first input capability is in the identified input capabilities. For example, the input framework 600 identifies the multi-modal hand pose estimator algorithm 762 using data from the HMD camera 754 as providing hand position capability The computing system determines (908) whether the first input capability is available at at least the minimum fidelity level in accordance with a determination that the first input capability is in the identified input capabilities. For example, the input framework 600 identifies the multi-modal hand pose estimator algorithm 762 using data from the HMD camera 754 as providing hand position capability at high fidelity.

The system provides (910), to the application, data to allow for performance of the first input capability in accordance with a determination that the first input capability is available at at least the minimum fidelity level. For example, the input framework 600 provides the hand position capability at high fidelity via the hand position provider 768.

The system notifies (912) the application that the first input capability at the minimum fidelity level cannot be provided in accordance with a determination that the first input capability is not available at at least the minimum fidelity level, or in accordance with a determination that the first input capability is not in the identified input capabilities. For example, the HMD camera 754 is disabled and hand position capability at high fidelity is not available so the application interface 604 informs the hand interaction application 776.

In some embodiments, low-fidelity head pose is based on GPS data where head position is directly measured, and head orientation inferred from marching direction. In some embodiments, low fidelity head pose is based on IMU data, where both head position and orientation are from dead-reckoning. In some embodiments, low-fidelity head pose is based on wireless signal (e.g., WiFi or BLE) scans, where head position is estimated via particle filter and head orientation is inferred from marching direction. In some embodiments, low-fidelity head pose is based on single-image relocalization, where one camera image is used to relocalize in a known map.

In some embodiments, medium-fidelity head pose is based on a visual-inertial odometer using one camera at low frame rate (e.g., 1 fps). In some embodiments, medium-fidelity head pose is based on a combination of data from GPS and an IMU sensor. In some embodiments, medium-fidelity head pose is based on electromagnetic tracking. In some embodiments, the medium-fidelity head pose is based on a body model and an IMU sensor.

In some embodiments, high-fidelity head pose is based on a visual-inertial odometer using multiple cameras at high frame rate (e.g., 30 fps). In some embodiments, high fidelity head pose is based on simultaneous localization and mapping (SLAM) data.

In some embodiments, low-fidelity hand position is based on a smartwatch IMU and arm model, e.g., where hand position can be roughly estimated assuming standard arm lengths and stiff wrist. In some embodiments, low-fidelity hand position is based on data from headset cameras with low-resolution (e.g., 160×120), monochrome, low framerate (e.g., 10 fps). In some embodiments, the low-fidelity hand position is based on an IMU and a body model.

In some embodiments, medium-fidelity hand position is based on a smartwatch IMU in combination with smartwatch proximity sensors, where the additional proximity sensors can provide information about hand pose. In some embodiments, medium-fidelity hand position is based on hand tracking with 1 camera.

In some embodiments, high-fidelity hand position is based on hand tracking with a camera in combination with a smartwatch IMU. In some embodiments, high-fidelity hand position is based on hand tracking with two or more headset cameras in combination with an external camera.

In some embodiments, low-fidelity keyboard is based on a device that has one physical button. In some embodiments, low-fidelity keyboard is based on a smartwatch IMU to detect a single pinch. In some embodiments, low-fidelity keyboard is based on a gesture to cover a camera with hand (e.g., a face-palm gesture). In some embodiments, low-fidelity keyboard is based on a shake sensor (e.g., a rage-shake gesture).

In some embodiments, medium-fidelity keyboard is based on a device that has between two and five physical buttons (e.g., a controller). In some embodiments, medium-fidelity keyboard is based on a smartwatch with EMG sensors to detect finger gestures. In some embodiments, medium-fidelity keyboard is based on a smartwatch with IMU to detect wrist gestures. In some embodiments, medium-fidelity keyboard is based on image-based hand gesture detection.

In some embodiments, high-fidelity keyboard is based on a device that has more than five physical buttons (e.g., a physical keyboard). In some embodiments, high-fidelity keyboard is based on a finger tapping on a surface with EMG sensors on both wrists. In some embodiments, high-fidelity keyboard is based on touchscreen inputs.

Figure 8A:
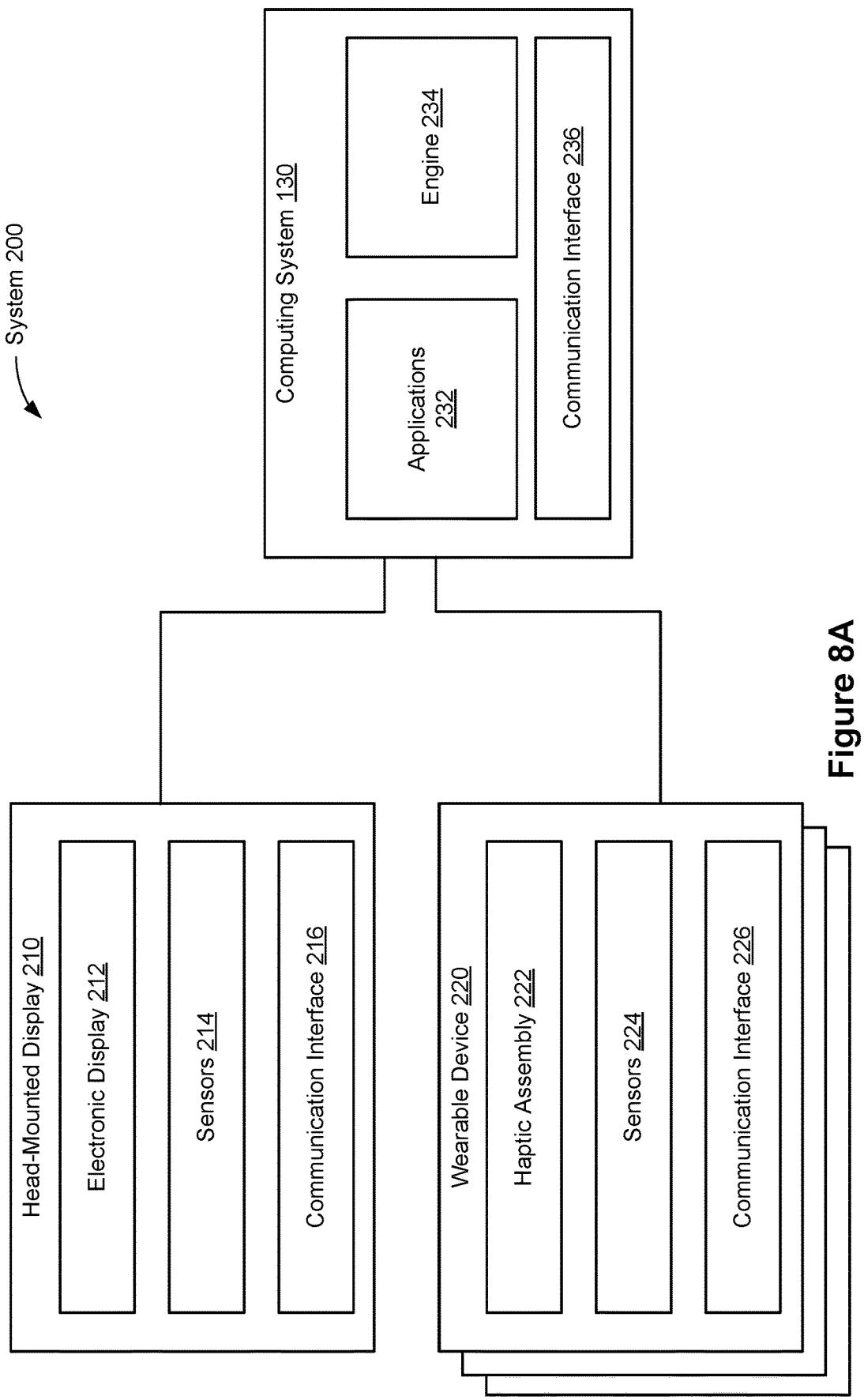
FIGS. 8A-8B are block diagrams illustrating an example artificial reality system in accordance with some embodiments.

FIG. 8A is a block diagram illustrating an artificial-reality system 200 in accordance with some embodiments. In some embodiments, the artificial-reality system 200 is the artificial-reality system 100. In some embodiments, the head-mounted display 210 is the head-mounted display 102, the head-worn device 108, or the eyewear device 110. The head-mounted display 210 presents media to a user. Examples of media presented by the head-mounted display 210 include images, video, audio, or some combination thereof. In some embodiments, audio is presented via an external device (e.g., speakers and/or headphones) that receives audio information from the head-mounted display 210, the computing system 130, or both, and presents audio data based on the audio information.

In accordance with some embodiments, the head-mounted display 210 includes an electronic display 212, sensors 214, and a communication interface 216. In some embodiments, the electronic display 212 displays images to the user in accordance with data received from the computing system 130. In various embodiments, the electronic display 212 comprises a single electronic display or multiple electronic displays (e.g., a separate display for each eye of a user).

In some embodiments, the sensors 214 include one or more hardware devices that detect spatial and motion information about the head-mounted display 210. The spatial and motion information may include information about the position, orientation, velocity, rotation, and acceleration of the head-mounted display 210. As an example, the sensors 214 include one or more inertial measurement units (IMUs) that detects rotation of the user's head while the user is wearing the head-mounted display 210. This rotation information can then be used (e.g., by the engine 234) to adjust the images displayed on the electronic display 212. In some embodiments, each IMU includes one or more gyroscopes, accelerometers, and/or magnetometers to collect the spatial and motion information. In some embodiments, the sensors 214 include one or more cameras positioned on the head-mounted display 210.

The communication interface 216 enables input and output, e.g., to the computing system 130. In some embodiments, the communication interface 216 is a single communication channel, such as HDMI, USB, VGA, DVI, or DisplayPort. In other embodiments, the communication interface 216 includes several distinct communication channels operating together or independently. In some embodiments, the communication interface 216 includes hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi) and/or any other suitable communication protocol. The wireless and/or wired connections may be used for sending data collected by the sensors 214 from the head-mounted display to the computing system 130. In such embodiments, the communication interface 216 may also receive audio/visual data to be rendered on the electronic display 212.

In some embodiments, the wearable device 220 is a smartwatch or wristband (e.g., the wearable device 104). In some embodiments, the wearable device 220 is a garment worn by the user (e.g., a glove, a shirt, or pants). In some embodiments, the wearable device 220 collects information about a portion of the user's body (e.g., the user's hand) that can be used as input for artificial-reality applications 232 executing on the computing system 130. In the illustrated embodiment, the wearable device 220 includes a haptic assembly 222, sensors 224, and a communication interface 226. In some embodiments, the wearable device 220 includes additional components that are not shown in FIG. 8A, such as a power source (e.g., an integrated battery, a connection to an external power source, a container containing compressed air, or some combination thereof), one or more processors, and memory.

The haptic assembly 222 provides haptic feedback to the user, e.g., by forcing a portion of the user's body (e.g., a hand) to move in certain ways and/or preventing the portion of the user's body from moving in other ways. In some embodiments, to accomplish this, the haptic assembly 222 is configured to apply a force that counteracts movements of the user's body detected by the sensors 214, increasing the rigidity of certain portions of the wearable device 220, or some combination thereof.

The sensors 224 include one or more hardware devices that detect spatial and motion information about the wearable device 220. Spatial and motion information can include information about the position, orientation, velocity, rotation, and acceleration of the wearable device 220 or any subdivisions of the wearable device 220, such as fingers, fingertips, knuckles, the palm, or the wrist when the wearable device 220 is a glove. In some embodiments, the sensors 224 include one or more IMUs, as discussed above with reference to the sensors 214.

The communication interface 226 enables input and output, e.g., to the computing system 130. In some embodiments, the communication interface 226 is a single communication channel, such as USB. In other embodiments, the communication interface 226 includes several distinct communication channels operating together or independently. For example, the communication interface 226 may include separate communication channels for receiving control signals for the haptic assembly 222 and sending data from the sensors 224 to the computing system 130. The one or more communication channels of the communication interface 226 are optionally implemented as wired or wireless connections. In some embodiments, the communication interface 226 includes hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet, HomePlug, etc.), and/or any other suitable communication protocol, including communication protocols not yet developed as of the filing date of this document.

The computing system 130 includes a communication interface 236 that enables input and output to other devices in the system 200. In some embodiments, the communication interface 236 is similar to the communication interface 216 and the communication interface 226.

In some embodiments, the computing system 130 is a computing device that executes artificial-reality applications 232 (e.g., virtual-reality applications, augmented-reality applications, or the like) to process input data from the sensors 214 on the head-mounted display 210 and the sensors 224 on the wearable device 220. The computing system 130 provides output data for (i) the electronic display 212 on the head-mounted display 210 and (ii) the haptic assembly 222 on the wearable device 220.

In some embodiments, the computing system 130 sends instructions (e.g., output data) to the wearable device 220. In response to receiving the instructions, the wearable device 220 creates one or more haptic stimulations (e.g., activates one or more of the haptic assemblies 222).

The computing system 130 is optionally implemented as any kind of computing device, such as an integrated system-on-a-chip, a microcontroller, a desktop or laptop computer, a server computer, a tablet, a smart phone or other mobile device. Thus, the computing system 130 includes components common to typical computing devices, such as a processor, random access memory, a storage device, a network interface, an I/O interface, and the like. The processor may be or include one or more microprocessors or application specific integrated circuits (ASICs). The memory may be or include RAM, ROM, DRAM, SRAM and MRAM, and may include firmware, such as static data or fixed instructions, BIOS, system functions, configuration data, and other routines used during the operation of the computing device and the processor. The memory also provides a storage area for data and instructions associated with applications and data handled by the processor.

The storage device provides non-volatile, bulk, or long-term storage of data or instructions in the computing device. The storage device may take the form of a magnetic or solid-state disk, tape, CD, DVD, or other reasonably high capacity addressable or serial storage medium. Multiple storage devices may be provided or available to the computing device. Some of these storage devices may be external to the computing device, such as network storage or cloud-based storage. The network interface includes an interface to a network and can be implemented as either wired or wireless interface. The I/O interface interfaces the processor to peripherals (not shown) such as, for example and depending upon the computing device, sensors, displays, cameras, color sensors, microphones, keyboards, and USB devices.

In the example shown in FIG. 8A, the computing system 130 further includes artificial-reality applications 232 and an artificial-reality engine 234. In some embodiments, the artificial-reality applications 232 and the artificial-reality engine 234 are implemented as software modules that are stored on the storage device and executed by the processor. Some embodiments of the computing system 130 include additional or different components than those described in conjunction with FIG. 8A. Similarly, the functions further described below may be distributed among components of the computing system 130 in a different manner than is described here.

Each artificial-reality application 232 is a group of instructions that, when executed by a processor, generates artificial-reality content for presentation to the user. In some embodiments, an artificial-reality application 232 generates artificial-reality content in response to inputs received from the user, e.g., via movement of the head-mounted display 210 or the wearable device 220. Examples of artificial-reality applications 232 include 3D modelling applications, gaming applications, conferencing applications, and video-playback applications.

The artificial-reality engine 234 is a software module that allows artificial-reality applications 232 to operate in conjunction with the head-mounted display 210 and the wearable device 220. In some embodiments, the artificial-reality engine 234 receives information from the sensors 214 on the head-mounted display 210 and provides the information to an artificial-reality application 232. Based on the received information, the artificial-reality engine 234 determines media content to provide to the head-mounted display 210 for presentation to the user via the electronic display 212 and/or a type of haptic feedback to be created by the haptic assembly 222 of the wearable device 220. For example, if the artificial-reality engine 234 receives information from the sensors 214 on the head-mounted display 210 indicating that the user has looked to the left, the artificial-reality engine 234 generates content for the head-mounted display 210 that mirrors the user's movement in an artificial environment.

Similarly, in some embodiments, the artificial-reality engine 234 receives information from the sensors 224 on the wearable device 220 and provides the information to an artificial-reality application 232. The application 232 can use the information to perform an action within the artificial world of the application 232. For example, if the artificial-reality engine 234 receives information from the sensors 224 that the user has closed his fingers around a position corresponding to a coffee mug in the artificial environment and raised his hand, a simulated hand in the artificial-reality application 232 picks up the artificial coffee mug and lifts it to a corresponding height. As noted above, the information received by the artificial-reality engine 234 can also include information from the head-mounted display 210. For example, cameras on the head-mounted display 210 may capture movements of the wearable device 220, and the application 232 can use this additional information to perform the action within the artificial world of the application 232.

The artificial-reality engine 234 may also provide feedback to the user that the action was performed. The provided feedback may be visual via the electronic display 212 in the head-mounted display 210 (e.g., displaying the simulated hand as it picks up and lifts the virtual coffee mug) and/or haptic feedback via the haptic assembly 222 in the wearable device 220.

Figure 8B:
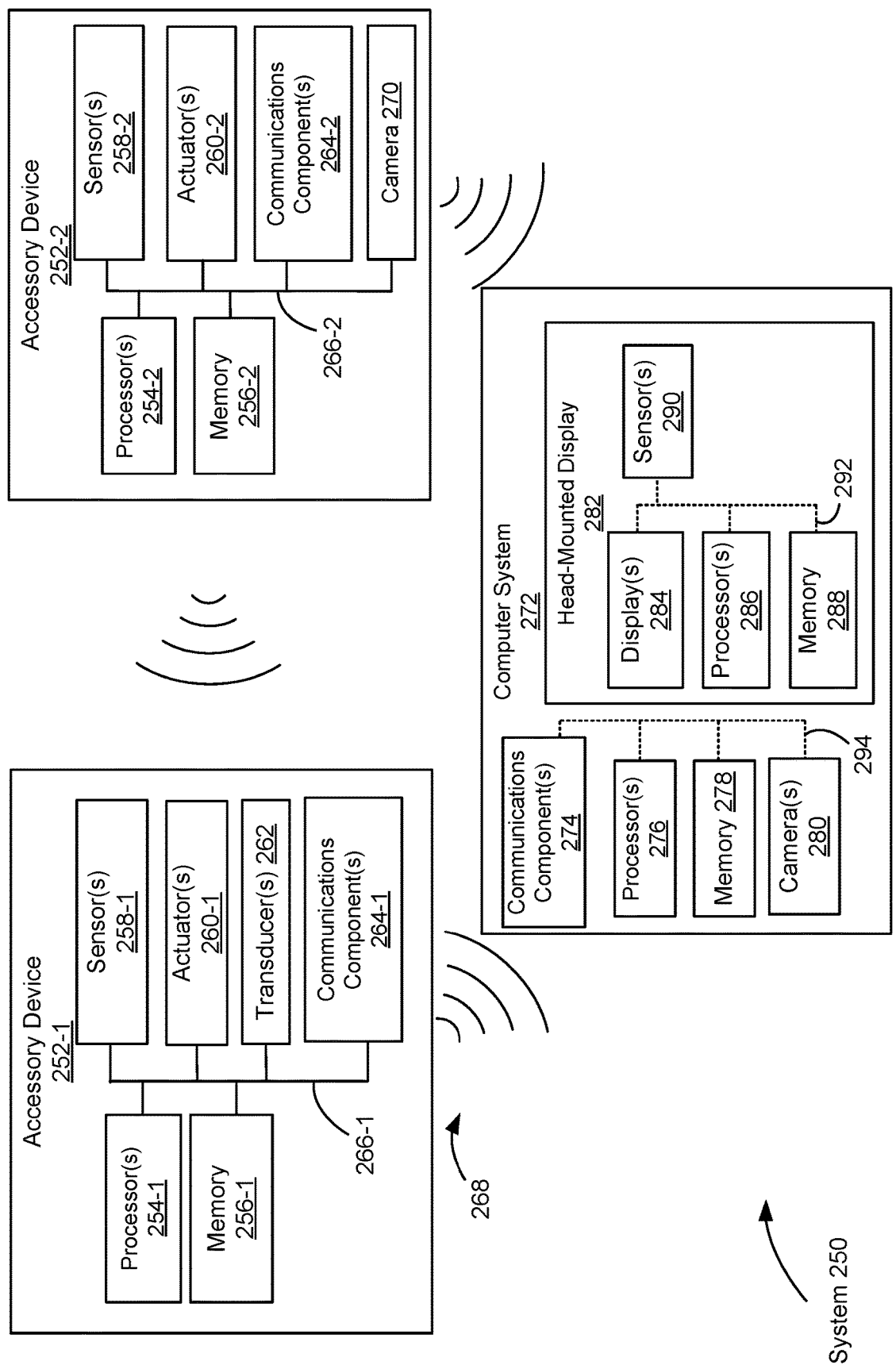

FIG. 8B is a block diagram illustrating a system 250 in accordance with some embodiments. While some example features are illustrated, various other features have not been illustrated for the sake of brevity and so as not to obscure pertinent aspects of the example embodiments disclosed herein. To that end, as a non-limiting example, the system 250 includes accessory devices 252-1 and 252-2, which are used in conjunction with a computer system 272 (e.g., computing system 130).

An example accessory device 252 includes, for example, one or more processors/cores 254 (referred to henceforth as "processors"), a memory 256, one or more actuators 260, one or more communications components 264, and/or one or more sensors 258. In some embodiments, these components are interconnected by way of a communications bus 266. References to these components of the accessory device 252 cover embodiments in which one or more of these components (and combinations thereof) are included. In some embodiments, the one or more sensors 258 and the one or more transducers 262 are the same components. In some embodiments, the example accessory device 252 includes one or more cameras 270. In some embodiments (not shown), accessory device 252 includes a wearable structure. In some embodiments the accessory device and the wearable structure are integrally formed. In some embodiments, the accessory device and the wearable structure are distinct structures, yet part of the system 250. In some embodiments, one or more of the accessory devices 252 is the wearable device 104 or the controller device 106.

For example, the accessory device 252-1 may be a ring that is used in conjunction with a wearable structure to utilize data measurements obtained by sensor 258-1 to adjust a fit of the wearable structure. In another example, the accessory device 252-1 and accessory device 252-2 are distinct wristbands to be worn on each wrist of the user.

In some embodiments, a single processor 254 (e.g., processor 254-1 of the accessory device 252-1) executes software modules for controlling multiple accessory devices 252 (e.g., accessory devices 252-1 ... 252-n). In some embodiments, a single accessory device 252 (e.g., accessory device 252-2) includes multiple processors 254 (e.g., processors 254-2), such as one or more actuator processors, one or more communications component processors, one or more sensor processors, and/or one or more transducer processors. In some embodiments, the one or more actuator processors are configured to adjust a fit of a wearable structure. In some embodiments, the one or more communications processors are configured to control communications transmitted by communications component 264 and/or receive communications by way of communications component 264. In some embodiments, the one or more sensor processors are configured to control operation of sensor 258 and/or receive output from sensors 258. In some embodiments, the one or more transducer processors are configured to control operation of transducers 262.

In some embodiments, the communications component 264 of the accessory device 252 includes a communications component antenna for communicating with the computer system 272. In some embodiments, the communications component 274 includes a complementary communications component antenna that communicates with the communications component 264. In some embodiments, the data contained within the communication signals alerts the computer system 272 that the accessory device 252 is ready for use. In some embodiments, the computer system 272 sends instructions to the accessory device 252, and in response to receiving the instructions, the accessory device 252 instructs a transmit and receive electrode to provide coupling information between the receive electrode and the user.

In some embodiments, the one or more actuators 260 are used to adjust a fit of the wearable structure on a user's appendage. In some embodiments, the one or more actuators 260 are also used to provide haptic feedback to the user. For example, each actuator 260 may apply vibration stimulations, pressure stimulations, shear stimulations, or some combination thereof to the user. In some embodiments, the one or more actuators 260 are hydraulic, pneumatic, electric, and/or mechanical actuators.

In some embodiments, the one or more transducers 262 are used to transmit and receive one or more signals 268. In some embodiments, the one or more sensors 258 are used to transmit and receive one or more signals 268. In some embodiments, the one or more sensors 258 and the one or more transducers 262 are part of a same component that is used to transmit and receive one or more signals 268. The signals 268 may be electromagnetic waves, mechanical waves, electrical signals, or any wave/signal capable of being transmitted through a medium. As used herein, a medium includes the wearer's skin, flesh, bone, blood vessels, or some combination thereof.

In addition to transmitting signals (e.g., electrical signals), the accessory device 252 is also configured to receive (e.g., detect, sense) signals transmitted by itself or by another accessory device 252. To illustrate, a first accessory device 252-1 may transmit a plurality of signals through a medium, such as a user's appendage, and a second accessory device 252-2 may receive the signals transmitted by the first accessory device 252-1 through the medium. Furthermore, an accessory device 252 receiving transmitted signals may use the received signals to determine whether the accessory device is in contact with a user.

In some embodiments, the one or more transducers 262 of the accessory device 252-1 include one or more transducers configured to generate and/or receive signals. In some embodiments, integrated circuits (not shown) of the accessory device 252-1, such as a controller circuit and/or signal generator, control the behavior of the transducers 262. In some embodiments, the transmit electrode and/or the receive electrode are part of the one or more transducers 262 of the accessory device 252-1. Alternatively, the transmit electrode and/or the receive electrode may be part of the one or more sensors 258-1 of the accessory device 252-1, or the transmit electrode may be part of a transducer 262 while the receive electrode may be part of a sensor 258-1 (or vice versa).

In some embodiments, the sensors 258 include one or more of the transmit electrode and the receive electrode for obtaining coupling information. Additional non-limiting examples of the sensors 258 (and the sensors 290) include, e.g., infrared, pyroelectric, ultrasonic, microphone, laser, optical, Doppler, gyro, accelerometer, resonant LC sensors, capacitive sensors, acoustic sensors, and/or inductive sensors. In some embodiments, the sensors 258 (and the sensors 290) are configured to gather additional data about the user (e.g., an impedance of the user's body). Examples of sensor data output by these sensors include body temperature data, infrared range-finder data, motion data, activity recognition data, silhouette detection and recognition data, gesture data, heart rate data, and other wearable device data (e.g., biometric readings and output, accelerometer data).

The computer system 272 is a computing device that executes artificial-reality applications (e.g., virtual-reality applications, augmented-reality applications, etc.) to process input data from the sensors 290 on the head-mounted display 282 and the sensors 258 on the accessory device 252. The computer system 272 provides output data to at least (i) the electronic display 284 on the head-mounted display 282 and (ii) the accessory device(s) 252. In some embodiments, the head-mounted display 282 is one of the head-mounted display 102, the head-worn device 108, or the eyewear device 110.

The computer system 272 includes one or more processors/cores 276, memory 278, one or more communications components 274, and/or one or more cameras 280. In some embodiments, these components are interconnected by way of a communications bus 294. References to these components of the computer system 272 cover embodiments in which one or more of these components (and combinations thereof) are included.

In some embodiments, the computer system 272 is a standalone device that is coupled to a head-mounted display 282. For example, the computer system 272 has processor(s)/core(s) 276 for controlling one or more functions of the computer system 272 and the head-mounted display 282 has processor(s)/core(s) 286 for controlling one or more functions of the head-mounted display 282. Alternatively, in some embodiments, the head-mounted display 282 is a component of computer system 272. For example, the processor(s) 276 controls functions of the computer system 272 and the head-mounted display 282. In addition, in some embodiments, the head-mounted display 282 includes the processor(s) 286 that communicate with the processor(s) 276 of the computer system 272. In some embodiments, communications between the computer system 272 and the head-mounted display 282 occur via a wired (or wireless) connection between communications bus 294 and communications bus 292. In some embodiments, the computer system 272 and the head-mounted display 282 share a single communications bus. It is noted that in some instances the head-mounted display 282 is separate from the computer system 272 (e.g., as illustrated in FIG. 1).

The computer system 272 may be any suitable computer device, such as a laptop computer, a tablet device, a netbook, a personal digital assistant, a mobile phone, a smart phone, an artificial-reality reality console or device (e.g., a virtual-reality device, an augmented-reality device, or the like), a gaming device, a computer server, or any other computing device. The computer system 272 is sometimes called a host or a host system. In some embodiments, the computer system 272 includes other user interface components such as a keyboard, a touch-screen display, a mouse, a track-pad, and/or any number of supplemental I/O devices to add functionality to computer system 272.

In some embodiments, one or more cameras 280 of the computer system 272 are used to facilitate the artificial-reality experience. In some embodiments, the computer system 272 provides images captured by the one or more cameras 280 to the display 284 of the head-mounted display 282, and the display 284 in turn displays the provided images. In some embodiments, the processors 286 of the head-mounted display 282 process the provided images. It is noted that in some embodiments, one or more of the cameras 280 are part of the head-mounted display 282.

The head-mounted display 282 presents media to a user. Examples of media presented by the head-mounted display 282 include images, video, audio, or some combination thereof. In some embodiments, audio is presented via an external device (e.g., speakers and/or headphones) that receives audio information from the head-mounted display 282, the computer system 272, or both, and presents audio data based on the audio information. The displayed images may be in virtual reality, augmented reality, or mixed reality. The display 284 displays images to the user in accordance with data received from the computer system 272. In various embodiments, the display 284 comprises a single electronic display or multiple electronic displays (e.g., one display for each eye of a user).

The sensors 290 include one or more hardware devices that detect spatial and motion information about the head-mounted display 282. Spatial and motion information can include information about the position, orientation, velocity, rotation, and acceleration of the head-mounted display 282. For example, the sensors 290 may include one or more inertial measurement units that detect rotation of the user's head while the user is wearing the head-mounted display 282. In some embodiments, the sensors 290 include one or more cameras positioned on the head-mounted display 282. In some embodiments, the head-mounted display 282 includes one or more sensors 290. In some embodiments, one or more of the sensors 290 are part of the computer system 272.

Figure 9A:
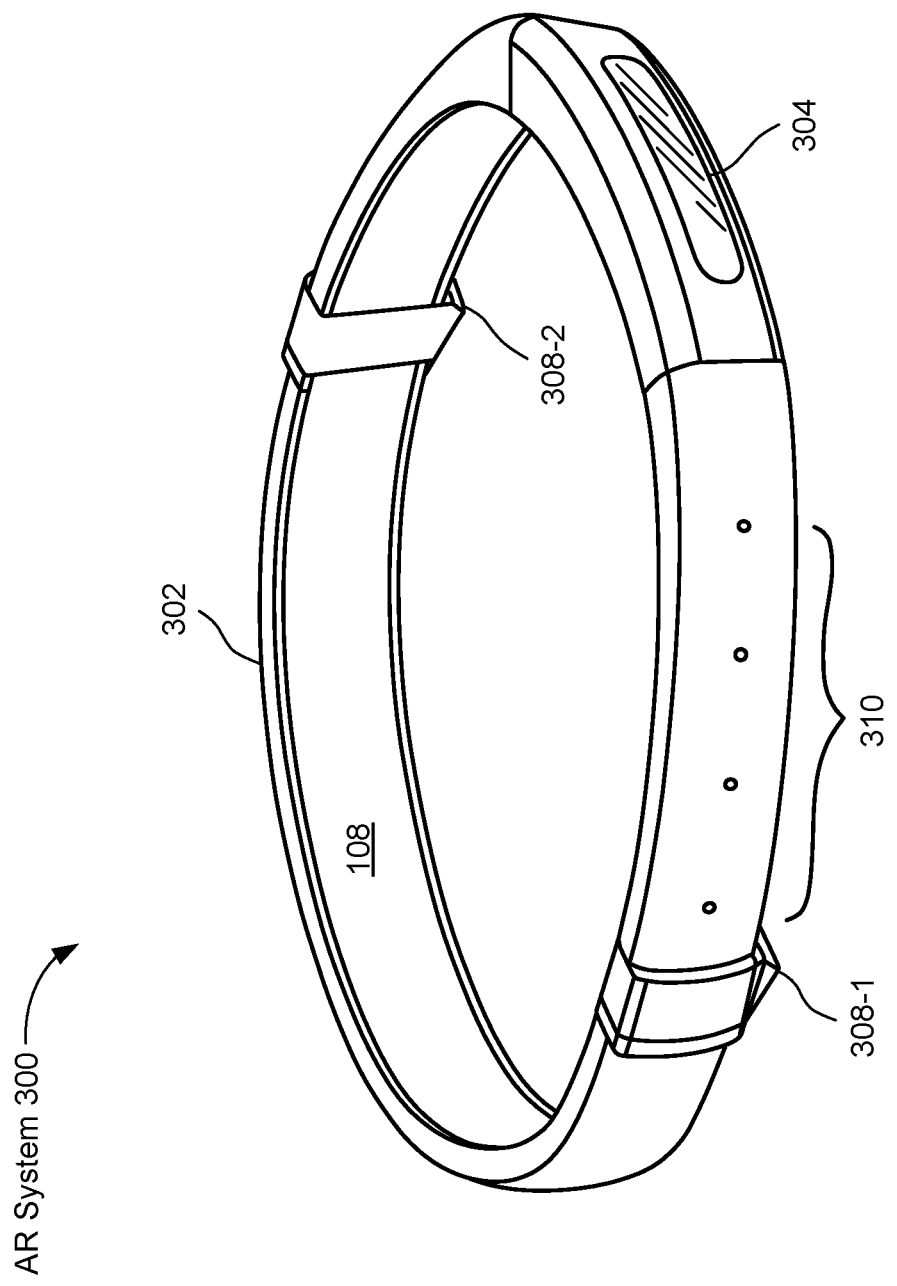
FIG. 9A shows an example artificial-reality system in accordance with some embodiments.
Figure 9B:
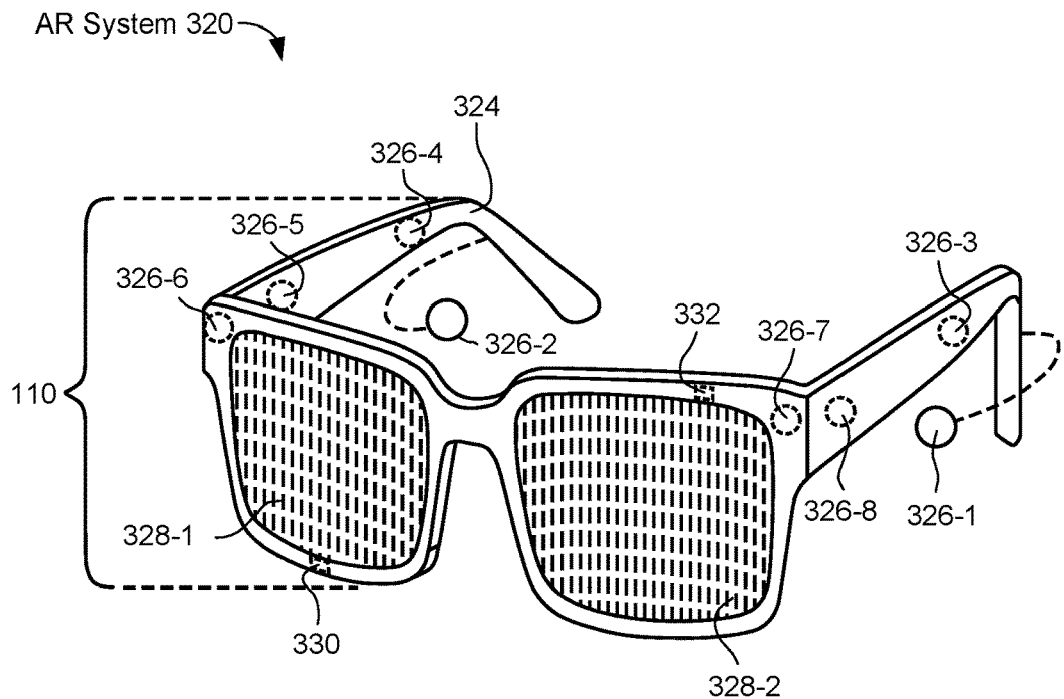
FIG. 9B shows an example augmented-reality system in accordance with some embodiments.
Figure 9C:
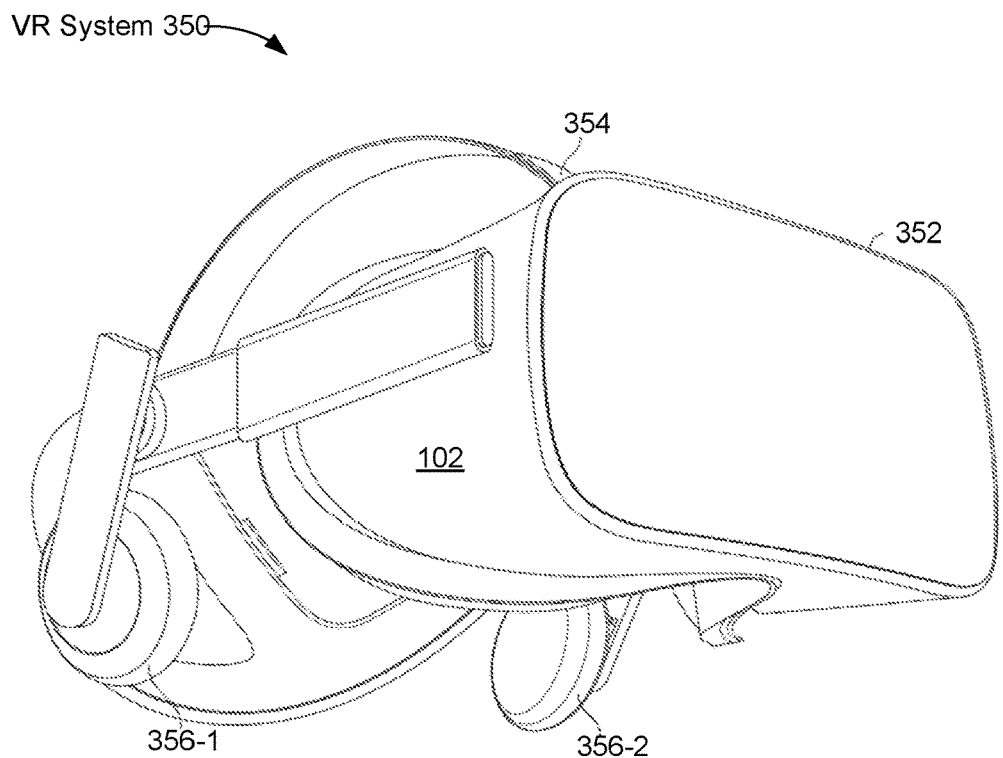
FIG. 9C shows an example virtual-reality system in accordance with some embodiments.

FIGS. 9A-9C provide additional examples of the artificial reality systems used in the system 100. The artificial-reality system 300 in FIG. 9A includes the head-worn device 108 dimensioned to fit about a body part (e.g., a head) of a user. In some embodiments, the artificial-reality system 300 includes the functionality of a wearable device (e.g., the wearable device 220). As shown, the head-worn device 108 includes a frame 302 (e.g., a band or wearable structure) and a camera assembly 304 that is coupled to the frame 302 and configured to gather information about a local environment by observing the local environment. In some embodiments, the artificial-reality system 300 includes a display (not shown) that displays a user interface. The head-worn device 108 includes output transducers 308-1 and 308-2 and input transducers 310. In some embodiments, the output transducers 308-1 and 308-2 provide audio feedback, haptic feedback, and/or content to a user, and the input audio transducers capture audio (or other signals/waves) in a user's environment.

Thus, the artificial-reality system 300 does not include a near-eye display (NED) positioned in front of a user's eyes. Artificial-reality systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While the artificial-reality system 300 may not include an NED, the artificial-reality system 300 may include other types of screens or visual feedback devices (e.g., a display screen integrated into a side of the frame 302).

The embodiments discussed in this disclosure may also be implemented in artificial-reality systems that include one or more NEDs. For example, as shown in FIG. 9B, the AR system 320 includes an eyewear device 110 with a frame 324 configured to hold a left display device 328-1 and a right display device 328-2 in front of a user's eyes. The display devices 328-1 and 328-2 may act together or independently to present an image or series of images to a user. While the AR system 320 includes two displays, embodiments of this disclosure may be implemented in AR systems with a single NED or more than two NEDs.

In some embodiments, the AR system 320 includes one or more sensors, such as the sensors 330 and 332 (e.g., examples of sensors 214, FIG. 8A). For example, the sensors 330 and 332 may generate measurement signals in response to motion of the AR system 320 and may be located on substantially any portion of the frame 810. Each sensor may be a position sensor, an inertial measurement unit (IMU), a depth camera assembly, or any combination thereof. In some embodiments, the AR system 320 includes more or less sensors than is shown in FIG. 9B. In embodiments in which the sensors include an IMU, the IMU may generate calibration data based on measurement signals from the sensors. Examples of the sensors include, without limitation, accelerometers, gyroscopes, magnetometers, other suitable types of sensors that detect motion, sensors used for error correction of the IMU, or some combination thereof.

In some embodiments, the AR system 320 includes a microphone array with a plurality of acoustic sensors 326-1 through 326-8, referred to collectively as the acoustic sensors 326. The acoustic sensors 326 may be transducers that detect air pressure variations induced by sound waves. In some embodiments, each acoustic sensor 326 is configured to detect sound and convert the detected sound into an electronic format (e.g., an analog or digital format). In some embodiments, the microphone array includes ten acoustic sensors: 326-1 and 326-2 designed to be placed inside a corresponding ear of the user, acoustic sensors 326-3, 326-4, 326-5, 326-6, 326-7, and 326-8 positioned at various locations on the frame 324, and acoustic sensors positioned on a corresponding neckband. In some embodiments, the neckband is an example of the computing system 130.

The configuration of the acoustic sensors 326 of the microphone array may vary. While the AR system 320 is shown in FIG. 9B having ten acoustic sensors 326, the number of acoustic sensors 326 may be greater or less than ten. In some situations, using more acoustic sensors 326 increases the amount of audio information collected and/or the sensitivity and accuracy of the audio information. In contrast, in some situations, using a lower number of acoustic sensors 326 decreases the computing power required by a controller 336 to process the collected audio information. In addition, the position of each acoustic sensor 326 of the microphone array may vary. For example, the position of an acoustic sensor 326 may include a defined position on the user, a defined coordinate on the frame 324, an orientation associated with each acoustic sensor, or some combination thereof.

The acoustic sensors 326-1 and 326-2 may be positioned on different parts of the user's ear, such as behind the pinna or within the auricle or fossa. In some embodiments, there are additional acoustic sensors on or surrounding the ear in addition to acoustic sensors 326 inside the ear canal. In some situations, having an acoustic sensor positioned next to an ear canal of a user enables the microphone array to collect information on how sounds arrive at the ear canal. By positioning at least two of the acoustic sensors 326 on either side of a user's head (e.g., as binaural microphones), the AR device 320 is able to simulate binaural hearing and capture a 3D stereo sound field around a user's head. In some embodiments, the acoustic sensors 326-1 and 326-2 are connected to the AR system 320 via a wired connection, and in other embodiments, the acoustic sensors 326-1 and 326-2 are connected to the AR system 320 via a wireless connection (e.g., a Bluetooth connection). In some embodiments, the AR system 320 does not include the acoustic sensors 326-1 and 326-2.

The acoustic sensors 326 on the frame 324 may be positioned along the length of the temples, across the bridge, above or below the display devices 328, or in some combination thereof. The acoustic sensors 326 may be oriented such that the microphone array is able to detect sounds in a wide range of directions surrounding the user wearing the AR system 320. In some embodiments, a calibration process is performed during manufacturing of the AR system 320 to determine relative positioning of each acoustic sensor 326 in the microphone array.

In some embodiments, the eyewear device 110 further includes, or is communicatively coupled to, an external device (e.g., a paired device), such as a neckband. In some embodiments, the neckband is coupled to the eyewear device 110 via one or more connectors. The connectors may be wired or wireless connectors and may include electrical and/or non-electrical (e.g., structural) components. In some embodiments, the eyewear device 110 and the neckband operate independently without any wired or wireless connection between them. In some embodiments, the components of the eyewear device 110 and the neckband are located on one or more additional peripheral devices paired with the eyewear device 110, the neckband, or some combination thereof. Furthermore, the neckband is intended to represent any suitable type or form of paired device. Thus, the following discussion of neckband may also apply to various other paired devices, such as smart watches, smart phones, wrist bands, other wearable devices, hand-held controllers, tablet computers, or laptop computers.

In some situations, pairing external devices, such as a neckband, with the AR eyewear device 110 enables the AR eyewear device 110 to achieve the form factor of a pair of glasses while still providing sufficient battery and computation power for expanded capabilities. Some, or all, of the battery power, computational resources, and/or additional features of the AR system 320 may be provided by a paired device or shared between a paired device and an eyewear device 110, thus reducing the weight, heat profile, and form factor of the eyewear device 110 overall while still retaining desired functionality. For example, the neckband may allow components that would otherwise be included on an eyewear device to be included in the neckband thereby shifting a weight load from a user's head to a user's shoulders. In some embodiments, the neckband has a larger surface area over which to diffuse and disperse heat to the ambient environment. Thus, the neckband may allow for greater battery and computation capacity than might otherwise have been possible on a stand-alone eyewear device. Because weight carried in the neckband may be less invasive to a user than weight carried in the eyewear device 110, a user may tolerate wearing a lighter eyewear device and carrying or wearing the paired device for greater lengths of time than the user would tolerate wearing a heavy, stand-alone eyewear device, thereby enabling an artificial-reality environment to be incorporated more fully into a user's day-to-day activities.

In some embodiments, the neckband is communicatively coupled with the eyewear device 110 and/or to other devices (e.g., the controller device 106). The other devices may provide certain functions (e.g., tracking, localizing, depth mapping, processing, storage, etc.) to the AR system 320. In some embodiments, the neckband includes a controller and a power source. In some embodiments, the acoustic sensors of the neckband are configured to detect sound and convert the detected sound into an electronic format (analog or digital).

The controller of the neckband processes information generated by the sensors on the neckband and/or the AR system 320. For example, the controller may process information from the acoustic sensors 326. For each detected sound, the controller may perform a direction of arrival (DOA) estimation to estimate a direction from which the detected sound arrived at the microphone array. As the microphone array detects sounds, the controller may populate an audio data set with the information. In embodiments in which the AR system 320 includes an IMU, the controller 336 may compute all inertial and spatial calculations from the IMU located on the eyewear device 110. The connector may convey information between the eyewear device 110 and the neckband and between the eyewear device 110 and the controller. The information may be in the form of optical data, electrical data, wireless data, or any other transmittable data form. Moving the processing of information generated by the eyewear device 110 to the neckband may reduce weight and heat in the eyewear device 110, making it more comfortable and safer for a user.

In some embodiments, the power source in the neckband provides power to the eyewear device 110 and the neckband. The power source may include, without limitation, lithium-ion batteries, lithium-polymer batteries, primary lithium batteries, alkaline batteries, or any other form of power storage. In some embodiments, the power source is a wired power source.

As noted, some artificial-reality systems may, instead of blending an artificial-reality with actual reality, substantially replace one or more of a user's sensory perceptions of the real world with a virtual experience. One example of this type of system is a head-worn display system, such as the VR system 350 in FIG. 9C, which mostly or completely covers a user's field of view. The VR system 350 includes the head-mounted display 102. The head-mounted display 102 includes a front body 352 and a frame 354 (e.g., a strap or band) shaped to fit around a user's head. In some embodiments, the head-mounted display 102 includes output audio transducers 356-1 and 356-2, as shown in FIG. 9C. In some embodiments, the front body 352 and/or the frame 354 includes one or more electronic elements, including one or more electronic displays, one or more IMUs, one or more tracking emitters or detectors, and/or any other suitable device or sensor for creating an artificial-reality experience.

Artificial-reality systems may include a variety of types of visual feedback mechanisms. For example, display devices in the AR system 320 and/or the VR system 350 may include one or more liquid-crystal displays (LCDs), light emitting diode (LED) displays, organic LED (OLED) displays, and/or any other suitable type of display screen. Artificial-reality systems may include a single display screen for both eyes or may provide a display screen for each eye, which may allow for additional flexibility for varifocal adjustments or for correcting a user's refractive error. Some artificial-reality systems also include optical subsystems having one or more lenses (e.g., conventional concave or convex lenses, Fresnel lenses, or adjustable liquid lenses) through which a user may view a display screen.

In addition to or instead of using display screens, some artificial-reality systems include one or more projection systems. For example, display devices in the AR system 320 and/or the VR system 350 may include micro-LED projectors that project light (e.g., using a waveguide) into display devices, such as clear combiner lenses that allow ambient light to pass through. The display devices may refract the projected light toward a user's pupil and may enable a user to simultaneously view both artificial-reality content and the real world. Artificial-reality systems may also be configured with any other suitable type or form of image projection system.

Artificial-reality systems may also include various types of computer vision components and subsystems. For example, the systems 300, 320, and 350 may include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

Artificial-reality systems may also include one or more input and/or output audio transducers. In the examples shown in FIGS. 9A and 9C, the output audio transducers 308 and 356 may include voice coil speakers, ribbon speakers, electrostatic speakers, piezoelectric speakers, bone conduction transducers, cartilage conduction transducers, and/or any other suitable type or form of audio transducer. Similarly, the input audio transducers may include condenser microphones, dynamic microphones, ribbon microphones, and/or any other type or form of input transducer. In some embodiments, a single transducer is used for both audio input and audio output.

In some embodiments, the artificial-reality systems 300, 320, and 350 include haptic (tactile) feedback systems, which may be incorporated into headwear, gloves, body suits, handheld controllers, environmental devices (e.g., chairs or floormats), and/or any other type of device or system, such as the wearable devices 220 discussed herein. The haptic feedback systems may provide various types of cutaneous feedback, including vibration, force, traction, shear, texture, and/or temperature. The haptic feedback systems may also provide various types of kinesthetic feedback, such as motion and compliance. The haptic feedback may be implemented using motors, piezoelectric actuators, fluidic systems, and/or a variety of other types of feedback mechanisms. The haptic feedback systems may be implemented independently of other artificial-reality devices, within other artificial-reality devices, and/or in conjunction with other artificial-reality devices.

Figure 10:
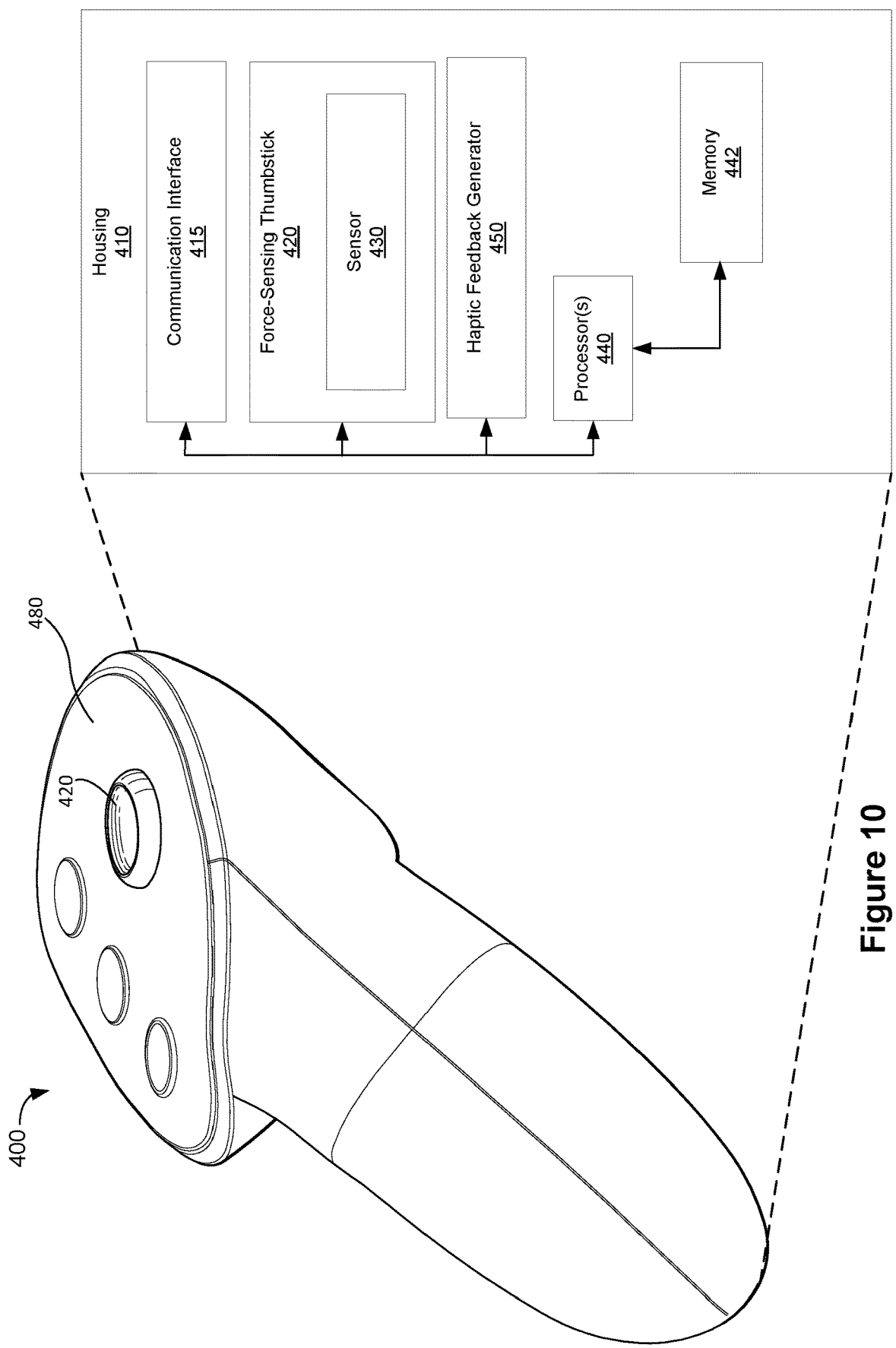
FIG. 10 shows an example controller in accordance with some embodiments.

FIG. 10 shows a controller 400 and components of the controller 400 in a block diagram next to the controller in accordance with some embodiments. In accordance with some embodiments, the controller 400 includes a housing 410 configured to house electrical and mechanical components of the controller 400. In some embodiments, the controller 400 is the controller device 106. In some embodiments, the housing 410 includes one or more of a communication interface 415, one or more thumbsticks 420, one or more sensors 430, one or more processors 440, and a haptic-feedback generator 450. In some embodiments, the sensors 430 are separate from the thumbstick 420, e.g., are mounted underneath the thumbstick 420.

For simplicity, the descriptions below primarily discuss one controller, which would be held in one of a user's hand (e.g., the controller is operable using one hand), but it should be understood that the descriptions herein also apply to a second controller that would be held by the user's other hand (the second controller also operable using one hand), such that the two controllers together allow the user to control actions and objects in an artificial-reality environment. Each controller can include an instance of a force-sensing thumbstick and a haptic-feedback generator discuss herein.

In some embodiments, the controller 400 communicatively couples to one or more controllable devices, such as a phone, a head-mounted device (e.g., artificial reality headset or glasses), a tablet, a computer, a console, or any other device capable of presenting or interacting with an artificial-reality environment to allow the control to control actions within the artificial-reality environment, and the controller 400 can also be configured to control devices in the physical world, such as remote control vehicles (e.g., a drone), a vehicle, and/or other similar devices. The controller 400 communicatively couples to one or more controllable devices using the communication interface 415 to establish wired or wireless connections. In some embodiments, the communication interface 415 includes hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet or HomePlug), and/or any other suitable communication protocol.

In some embodiments, the controller 400 is configured to provide control instructions (based on user input) to the one or more controllable devices to control or interact with the controllable device. For example, in some embodiments, the controller 400 is configured to provide control instructions (based on user input, such as force-based inputs provided at the thumbstick) to the one or more controllable devices to control or interact with one or more of a virtual avatar, a user interface (and one or more objects within the user interface), and/or any other aspect of an artificial-reality system environment (and one or more objects within the artificial-reality system environment). In another example, the controller 400 is usable to operate a drone, drive a car, control a camera, operate a display, etc.

A thumbstick 420 (which can also be referred to more generally as a control stick) is an input device for generating control instructions at the controller 400 for controlling (or interacting with) the one or more controllable devices. For example, the thumbstick 420 of the controller can be used to control objects in an artificial-reality environment, such as by moving the thumbstick around to different positions to move an avatar or other object around within an artificial-reality environment. In some embodiments, the thumbstick 420 has a stationary default position relative to a top portion 480 of the housing 410. In some embodiments, the thumbstick 420 extends outside of the top portion 480 of the housing of the controller 400. The thumbstick 420 is configured to be moved (or tilted) to different positions relative to the top portion of the housing 410. Moreover, the position (or tilt angle) of the thumbstick 420 relative to the top portion of the housing 410 is continuously monitored via the one or more sensors 430 to determine the exact position of the thumbstick 420 within its full range of motion.

The thumbstick 420 is configured to move freely in two-dimensions (e.g., x and y dimensions on the same plane as the top portion 480 of the housing 410) and provides two-dimensional input for controlling (or interacting with) the one or more controllable devices. In some embodiments, the thumbstick 420 includes a mechanical switch that allows for pressing of the thumbstick 420 and/or movement in a vertical direction. In some embodiments, the one or more sensors 430 sense a force applied to the thumbstick 420 based on application of downward pressure (downward relative to the top portion 480 of the housing) to the thumbstick 420. In some embodiments, the thumbstick 420 includes a capacitive sensor to detect that the user's thumb (or any other finger) has contacted the thumbstick 420.

In some embodiments, the one or more sensors 430 are used to monitor the position (and/or tilt angle) of the thumbstick 420. In some embodiments, the one or more sensors 430 include one or more FSRs, potentiometers, infrared sensors, magnetometers, proximity sensors, hall sensors, ultrasonic sensors, and/or other position tracking sensors. In some embodiments, the one or more sensors 430 are positioned within the housing 410 below the thumbstick 420. In some embodiments, the one or more sensors 430 are integrated within a control module of the thumbstick 420.

The one or more sensors 430 sense (or detect) the three-dimensional input for controlling (or interacting with) the one or more controllable devices provided by the user via the thumbstick 420, and provides data corresponding to the three-dimensional input to the one or more processors 440 for performing one or more operations as discussed below.

The one or more processors 440 can be implemented as any kind of suitable computing device, such as an integrated system-on-a-chip, a microcontroller, an FPGA, a microprocessor, and/or other application specific integrated circuits (ASICs). The processor may operate in conjunction with memory 442. The memory 442 may be or include RAM, ROM, DRAM, SRAM and MRAM, and may include firmware, such as static data or fixed instructions, BIOS, system functions, configuration data, and other routines used during the operation of the controller 400 and the processor 440. The memory 442 also provides a storage area for data and instructions associated with applications and data handled by the processor 440. Although not shown, in some embodiments, the memory 442 is stored in a remote device, e.g., the computer system 272, or other computer-readable storage medium that is accessible to the one or more processors 440.

The one or more processors 440 provide instructions to the haptic-feedback generator 450 to provide haptic feedback to the user, e.g., based on a determination that the magnitude of the force applied to the thumbstick 420 satisfies a predefined force value. In some embodiments, the one or more processors 440 are configured to alter haptic feedback responses provided to the user based on the rate of change in the magnitude of the force applied to the thumbstick 420.

The haptic-feedback generator 450 includes one or more of a speaker, a motor, an LED, a display, a fan, a heating element, and a vacuum. The haptic-feedback generator 450 provides the user with one or more haptic feedback events (also referred to herein as haptic feedback responses) such as one or more of a vibration, a sound, a temperature change, a visual indicator (e.g., inside the controllable device (e.g., an artificial-reality environment) and/or outside controllable device (e.g., visible to the user), a simulated shock, and a pressure). In some embodiments, different haptic feedback events are provided based on the user's inputs to the controller 400. Different intensities of the one or more haptic feedback events can include stronger haptic feedback events, haptic feedback events with increased durations, more frequent haptic feedback events, etc.

In some embodiments, the controller 400 includes a stylus/pointer, e.g., that can be attached to a part of the housing 410. In some embodiments, the stylus/pointer can be placed at a bottom part of the housing 410 and the controller can then be flipped around (from holder the controller with the thumbstick 420 facing up to flipping the controller around so the thumbstick 420 is facing downward) in a user's hand to allow for use of the stylus/pointer.

Figure 11:
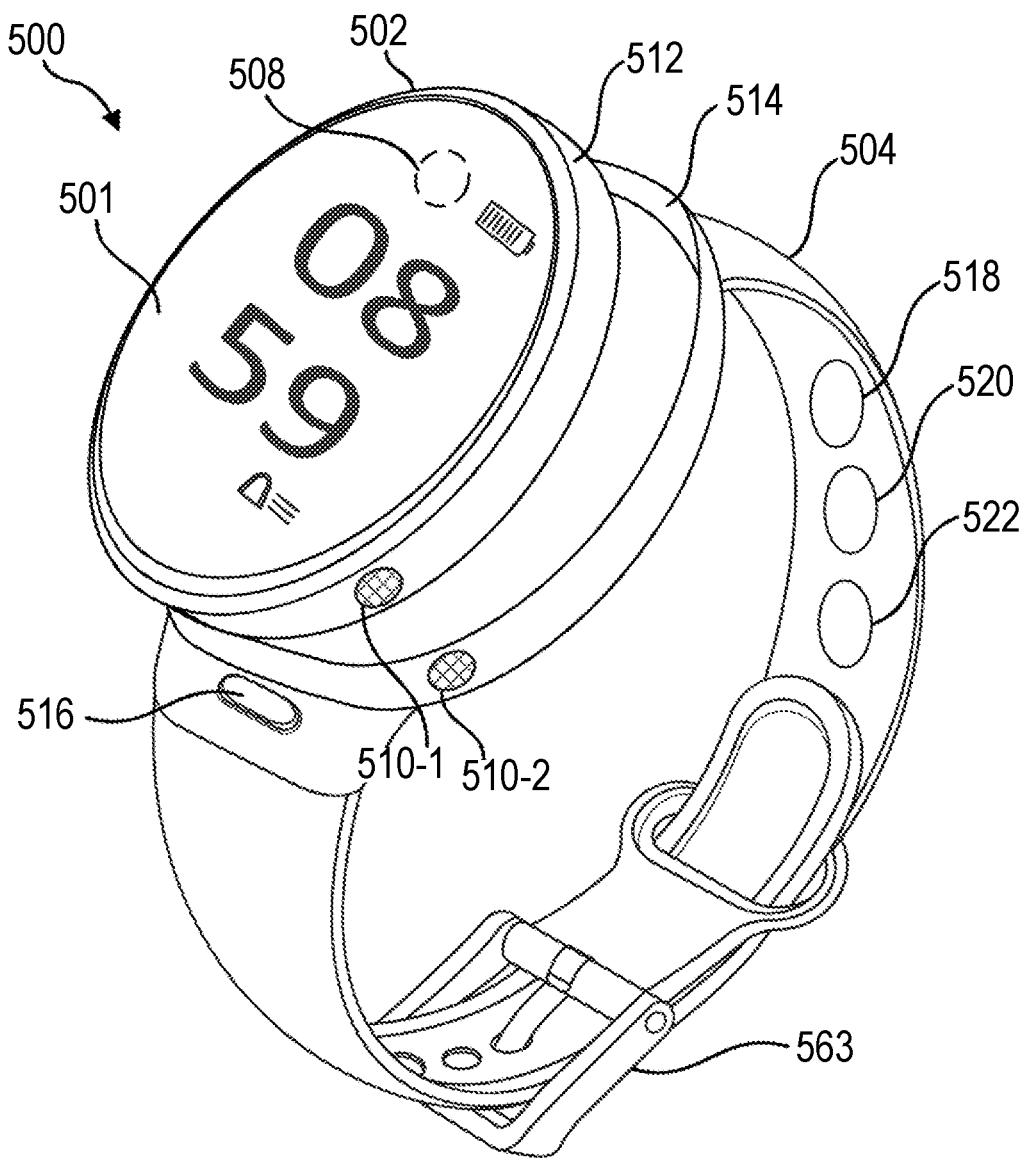
FIG. 11 illustrates an example wearable device in accordance with some embodiments.

FIG. 11 illustrates a wearable device 500 in accordance with some embodiments. The wearable device 104 shown and described in reference to FIG. 1 can be an instance of the wearable device 500. FIG. 11 illustrates a perspective view of the wearable device 500 that includes a device body 502 decoupled from a device band 504. The device body 502 and the device band 504 are configured to allow a user to wear the wearable device 500 on a body part (e.g., a wrist). The wearable device 500 includes a retaining mechanism 563 (e.g., a buckle, a hook and loop fastener, etc.) for securing the device band 504 to the user's body. The wearable device 500 also includes a coupling mechanism 514 (e.g., a cradle) for detachably coupling device body 502 (via a coupling surface 512 of the device body 502) to device band 504.

Functions executed by the wearable device 500 can include, without limitation, display of visual content to the user (e.g., visual content displayed on display screen 501), sensing user input (e.g., sensing a touch on button 516, sensing biometric data on sensor 518, sensing neuromuscular signals on neuromuscular sensor 520, etc.), messaging (e.g., text, speech, video, etc.), image capture, wireless communications (e.g., cellular, near field, WiFi, personal area network, etc.), location determination, financial transactions, providing haptic feedback, alarms, notifications, biometric authentication, health monitoring, sleep monitoring, etc. These functions can be executed independently in the device body 502, independently in the device band 504, and/or in communication between device body 502 and the device band 504. In some embodiments, functions can be executed on the wearable device 500 in conjunction with an artificial-reality environment.

In some embodiments, the device band 504 is configured to be worn by a user such that an inner surface of the device band 504 is in contact with the user's skin. Thus, when worn by a user, the sensor 518 is in contact with the user's skin. In some embodiments, the sensor 518 is a biosensor that senses a user's heart rate, saturated oxygen level, temperature, sweat level, muscle intentions, or a combination thereof. In some embodiments, the device band 504 includes multiple sensors 518 that can be distributed on an inside and/or an outside surface of the device band 504. Additionally, or alternatively, the device body 502 includes the same or different sensors than the device band 504. The device body 502 (e.g., a capsule portion) can include, without limitation, a magnetic field sensor, antenna return loss sensor, front-facing image sensor 508 and/or a rear-facing image sensor, a biometric sensor, an IMU, a heart rate sensor, a saturated oxygen sensor, a neuromuscular sensor (s), an altimeter sensor, a temperature sensor, a bioimpedance sensor, a pedometer sensor, an optical sensor, a touch sensor, a sweat sensor, etc. The sensor 518 can also include a sensor that provides data about a user's environment including a user's motion (e.g., an IMU), altitude, location, orientation, gait, or a combination thereof. The sensor 518 can also include a light sensor (e.g., an infrared light sensor, a visible light sensor) that is configured to track a position and/or motion of the device body 502 and/or the device band 504. In some embodiments, the device band 504 transmits the data acquired by the sensor 518 to device body 502 using a wired communication method (e.g., a UART, a USB transceiver, etc.) and/or a wireless communication method (e.g., near field communication, Bluetooth™, etc.). In some embodiments, the device band 504 is configured to operate (e.g., to collect data using sensor 518) independent of whether device body 502 is coupled to or decoupled from device band 504.

The device band 504 includes a haptic device 522 (e.g., a vibratory haptic actuator) that is configured to provide haptic feedback (e.g., a cutaneous and/or kinesthetic sensation, etc.) to the user's skin. The sensor 518 and/or the haptic device 522 can be configured to operate in conjunction with multiple applications including, without limitation, health monitoring, social media, game playing, and artificial reality (e.g., the applications associated with artificial reality).

In some embodiments, the device band 504 includes a neuromuscular sensor 520 (e.g., an electromyography (EMG) sensor, a mechanomyogram (MMG) sensor, a sonomyography (SMG) sensor, etc.). The neuromuscular sensor 520 senses a user's intention to perform certain motor actions. The sensed muscle intention can be used to control certain user interfaces displayed on the display 501 and/or can be transmitted to a device responsible for rendering an artificial-reality environment (e.g., the head-mounted display 102) to perform an action in an associated artificial-reality environment, such as to control the motion of a virtual device displayed to the user.

In some embodiments, signals from the neuromuscular sensor 520 are used to provide a user with an enhanced interaction with a physical object and/or a virtual object in an artificial-reality application generated by an artificial-reality system. Although FIG. 11 shows one neuromuscular sensor 520, the device band 504 can include a plurality of neuromuscular sensors 520 arranged circumferentially on an inside surface of the device band 504 such that the plurality of neuromuscular sensors 520 contact the skin of the user. The neuromuscular sensor 520 senses and records neuromuscular signals from the user as the user performs muscular activations (e.g., movements, gestures, etc.). The muscular activations performed by the user can include static gestures, such as placing the user's hand palm down on a table; dynamic gestures, such as grasping a physical or virtual object; and covert gestures that are imperceptible to another person, such as slightly tensing a joint by co-contracting opposing muscles or using sub-muscular activations. The muscular activations performed by the user can include symbolic gestures (e.g., gestures mapped to other gestures, interactions, or commands, for example, based on a gesture vocabulary that specifies the mapping of gestures to commands).

As shown in the example of FIG. 11, the device band coupling mechanism 514 can include a type of frame or shell that allows the coupling surface 512 to be retained within device band coupling mechanism 514. The device body 502 can be detachably coupled to the device band 504 through a friction fit, magnetic coupling, a rotation-based connector, a shear-pin coupler, a retention spring, one or more magnets, a clip, a pin shaft, a hook and loop fastener, or a combination thereof. In some embodiments, the device body 502 is decoupled from the device band 504 by actuation of a release mechanism 510. The release mechanism 510 can include, without limitation, a button, a knob, a plunger, a handle, a lever, a fastener, a clasp, a dial, a latch, or a combination thereof.

Turning now to some example embodiments.

(A1) In one aspect, some embodiments include a method (e.g., the method 800) of using a hardware-agnostic input framework (e.g., the input framework 600) of an operating system to determine how to provide an input capability at different fidelity levels to an application (e.g., the hand interaction application 776). In some embodiments, the method is performed at a computing system (e.g., the computing system 130). The method includes: (i) receiving, from an application (e.g., the hand interaction application 776) executing on an operating system associated with an artificial-reality system (e.g., the artificial-reality system 100, 200, or 250) that includes one or more human-machine-interface (HMI) devices, a request identifying a requested input capability for making an input operation available within the application; and (ii) in response to receiving the request: (a) identifying, by the operating system, two or more techniques (e.g., two or more algorithms 612) that the artificial-reality system can use to make the requested input capability available to the application using data from the one or more HMI devices, each of the two or more techniques associated with a respective fidelity level of at least two distinct fidelity levels at which the requested input capability can be made available to the application; (b) selecting a first technique of the two or more techniques for making the requested input capability available to the application; and (c) using the first technique to provide, to the application, data to allow for performance of the requested input capability. In some embodiments, the HMI devices include one or more of: a head-mounted display, a wearable device, and a controller device. In some embodiments, the operating system identifies one technique (e.g., one algorithm 612) that the artificial-reality system can use to make the requested input capability available to the application using data from the one or more HMI devices; and the operating system selects the one technique for making the requested input capability available to the application.

In various embodiments, the computing system is a smartphone, a smartwatch, a laptop, or a tablet. In some embodiments, the operating system uses a hardware-agnostic input framework in performing the identifying, and an example hardware-agnostic input framework is the input framework 600 depicted in FIGS. 6 and 7. In some embodiments, the techniques are identified by consulting the input framework and can include combinations of hardware and software algorithms used to provide the requested input capability. In some embodiments, the operating system makes use of the hardware-agnostic framework to make the requested input capability available at least at a low fidelity level.

In some embodiments, the request includes a minimum fidelity level and/or a desired fidelity level. The at least two distinct fidelity levels can include a high, medium, and low fidelity level. For example, low fidelity for position error is greater than 10 cm; low fidelity orientation error is greater than 10 degrees; and low fidelity for actions is 1 discrete action. In this example, medium fidelity for position error is between 1 and 10 cm; medium fidelity for orientation error is between 1 and 10 degrees; and medium fidelity for actions is between 2 and 4 discrete actions. In this example, high fidelity for position error is within 1 cm; high fidelity for orientation error is within 1 degree; and high fidelity for actions is more than 5 discrete actions.

(A2) In some embodiments of A1, the first technique is selected by the operating system because it allows for performance of the requested input capability at a respective fidelity level that is higher than those associated with all other techniques of the two or more techniques. For example, the operating system at the identifying operation identifies a number of different techniques for making the requested input capability available to the application at different fidelity levels. In this example, the operating system can choose the technique that is associated with a highest fidelity level as compared to the other identified techniques.

(A3) In some embodiments of A1 or A2, information regarding the two or more techniques is provided by the operating system to the application (e.g., via the application interface 604) and the application performs the selecting operation.

(A4) In some embodiments of A1-A3, the method further includes, in response to detecting that an additional HMI device is included in the artificial-reality system: (i) identifying, by the operating system, an additional technique, distinct from the two or more techniques, that the artificial-reality system can use to make the requested input capability available to the application at a respective fidelity level of the at least two distinct fidelity levels using data from the additional HMI device in addition to data from the one or more HMI devices; and (ii) in accordance with a determination that the additional technique is associated with a respective fidelity level that is higher than the respective fidelity levels associated with the two or more techniques: (a) ceasing to use the first technique to provide the data to the application to allow for performance of the request input capability, and (b) using the additional technique to provide to the application updated data to allow for performance of the requested input capability.

(A5) In some embodiments of A1-A4: (i) data from a first HMI device is used in conjunction with the first technique, and (ii) the method further includes, in response to detecting that the first HMI device is no longer available: (a) selecting a different technique of the two or more techniques for making the requested input capability available to the application, the different technique being associated with a second fidelity level that is lower than a first fidelity level associated with the first technique; and (b) using the different technique to provide, to the application, data to allow for performance of the requested input capability. In this way, the applications are not required to specify or restrict the type of hardware that can be used. The applications need only to specify the capabilities required and the input framework handles the mapping of capabilities to hardware resources. This also improves the user's flexibility because if a device is unavailable, or they do not want to use a device, the applications can still function using other hardware resources (even if those resources were not anticipated by the application developers).

(A6) In some embodiments of A1-A5: (i) the application executing on the operating system is a first application, (ii) the requested input capability is a first requested input capability, and (iii) the method further includes: (a) receiving, from a second application, distinct from the first application, executing on the operating system associated with the artificial-reality system, another request identifying a second requested input capability, distinct from the first request input capability, for making the input operation available within the second application; and (b) in response to receiving the other request: (1) identifying, by the operating system, a technique that the artificial-reality system can used to make the second requested input capability available to the second application using data from the one or more HMI devices; and (2) using the technique to provide, to the second application, data to allow for performance of the second requested input capability while continuing to use the first technique to provide data to the application to allow for performance of the requested input capability.

For example, by making the framework available at the operating system level, systems are able to make use of various input-provision techniques simultaneously to multiple different applications, e.g., one technique can be utilized based on optical data from an image sensor to detect leg movements, while another technique can be utilized based on EMG data to detect finger, hand, and wrist movements, and all of this can occur in parallel. This can occur for numerous different applications requesting numerous different input capabilities. For example, the techniques made available by the operating-system-level framework can be utilized by ten or more applications, each using a different input-provision technique, simultaneously.

In some embodiments, the third fidelity is equal to the first fidelity, for example, the substituted HMI device can provide a fidelity level that is the same as the initial fidelity level). In some embodiments, the third fidelity is less than the first fidelity, e.g., the substituted HMI device can only provide less fidelity. As an example, an HMI device can be detected as no longer being included in the artificial-reality system based on the device being turned off (e.g., manually or automatically), disconnected (e.g., poor signal), low power, low computing resources, low lighting, low reception, or low accuracy in sensed data (e.g., loss of GPS signal, poor EMG impedance, and the like).

(A7) In some embodiments of A6, the method further includes, in response to detecting that the first HMI device is no longer available, providing to the application an indication that the first technique is no longer available, and that the different technique will be utilized instead to allow for performance of the requested input capability at a minimum fidelity level.

For example, the one or more options could include using another HMI device, turning the device back on, adjusting use of the HMI device, for example, moving to a location with better service if relying on a wireless connection or network, adjusting or cleaning a camera, turning on a device, activating sensors (e.g., proximity sensor, IMUs, etc.) on a device, and the like.

(A8) In some embodiments of A6 or A7, the method further includes, in response to detecting that the first HMI device is no longer available, notifying a user of the artificial-reality system that the requested input capability will be provided at a minimum fidelity level, e.g., notifying via a display, a speaker, and/or haptic feedback.

(A9) In some embodiments of A8, the notification includes instructions specifying one or more additional HMI devices that can provide the requested input capability at a fidelity level from among the at least two distinct fidelity levels. In some embodiments, the notifications specify one or more additional HMI devices that should be turned on, used in place of the current HMI devices, and/or used in conjunction with the HMI devices.

(A10) In some embodiments of A8 or A9, the notification instructs a user to stop using the application until the requested input capability can be provided.

(A11) In some embodiments of A8-A10, the notification notifies a user of a degradation in performance.

(A12) In some embodiments of A8-A11, the notification notifies a user that the application is usable while the requested input capability is unavailable. In some embodiments, the notification lets the user know of other input capabilities that can be used in place of the requested input capability.

(A13) In some embodiments of A1-A12, the requested input capability uses one or more of: hand orientation, hand position, hand action, hand gesture, wrist gestures, wrist position, torso pose, and head pose to make the input operation available within the application. In embodiments in which the user is known to be holding an input device, then the requested input capability can also be based on information about controller orientation, controller position, controller action, controller gesture, keyboard, air mouse. In some embodiments, the requested input capability uses input force in combination with a switch, lever, and/or button activation (e.g., affordances that do not include native force sensing) to make the input operation available within the application. In some embodiments, recognizing a hand action (e.g., a button press) includes recognizing an amount of force involved in performance the hand action.

(A14) In some embodiments of A1-A13, the one or more HMI devices includes a wrist-wearable device including one or more of an IMU sensor, a GPS, a WiFi antenna, a BLE antenna, an EMG sensor, a proximity sensor, an electromagnetic sensor, and a camera; and the requested input capabilities provided by the wrist-wearable device include one or more of hand orientation, hand position, hand action, hand gesture, wrist gestures, wrist position, force input, controller orientation, controller position, controller action, controller gesture, keyboard, and air mouse.

(A15) In some embodiments of A1-A14, the one or more HMI devices includes a head-worn device including one or more of an IMU sensor, a GPS, a WiFi antenna, a BLE antenna, an EMG sensor, a proximity sensor, a display, an electromagnetic sensor, and a camera; and the requested input capabilities provided by the head-worn device include one or more of hand orientation, hand position, hand action, hand gesture, wrist gestures, wrist position, controller orientation, controller position, controller action, controller gesture, keyboard, air mouse, torso pose, and head pose.

(A16) In some embodiments of A1-A15, the one or more HMI devices includes a controller including one or more of an IMU sensor, a GPS, a WiFi antenna, a BLE antenna, an EMG sensor, an electromagnetic sensor, and a proximity sensor; and the requested input capabilities provided by the controller include one or more of hand orientation, hand position, hand action, wrist position, controller orientation, controller position, controller action, and controller gesture. Additional HMI devices include a smartphone, a smartwatch, a bracelet, an anklet, a computer, a GPU, a camera, and/or a speaker.

(A17) In some embodiments of A1-A16, the receiving operation is performed at initialization of the artificial-reality system, detecting availability of the one or more HMI devices for use with the artificial-reality system. In some embodiments, the HMI devices are detected based on wired or wireless connections, integrated devices, manually or automatically enabled devices, and the like.

(B1) In another aspect, some embodiments include a method of using a hardware-agnostic input framework (e.g., the input framework 600) of an operating system to provide a force input capability to an application (e.g., the controller interaction application 779). In some embodiments, the method is performed at a computing system (e.g., the computing system 130). The method includes: (i) receiving, from an application (e.g., the controller interaction application 779) executing on an operating system associated with an artificial-reality system (e.g., the artificial-reality system 100, 200, or 250) that includes a controller (e.g., the controller device 106) and an electromyography (EMG) device (e.g., the wearable device 104), a request identifying a force input capability for making an input operation available within the application; (ii) determining (e.g., via the hardware manager 614) whether the controller includes a force sensor; (iii) in accordance with a determination that the controller includes the force sensor, selecting the force sensor for providing the force input capability; and (iv) in accordance with a determination that the controller does not include the force sensor, selecting the EMG device (e.g., the wrist EMG 780) for providing the force input capability.

(B2) In some embodiments of B1, the controller includes a mechanical button (e.g., the button 402) and the force input capability is a capability to detect an amount of force applied to the mechanical button (e.g., whether an activation of the button meets or exceeds a preset force threshold).

(B3) In some embodiments of B1 or B2, the EMG device is a wrist-wearable device (e.g., the wearable device 104). In some embodiments, the EMG device is a smartwatch or bracelet in communication with one or more EMG sensors coupled to a user's wrist.

(B4) In some embodiments of B1-B3, the method further includes, in accordance with selecting the EMG device for providing the force input capability, providing to the application an indication that the EMG device is being used for providing the force input capability.

(B5) In some embodiments of B1-B4, the method further includes, in accordance with selecting the EMG device for providing the force input capability, providing a notification to a user to indicate that the EMG device is being used for providing the force input capability. For example, providing a notification to the user that the EMG device is being turned on, powered up, and/or in use while the application is active.

In some embodiments, at system boot, the input framework examines a hardware platform and identifies the input capabilities and fidelity levels that can be supported on this platform. When an application launches, the application requests from the input framework: (i) input capabilities needed by the application, and (ii) the minimum fidelity level required for each input capability. The input framework, using the available hardware, attempts to provide the capabilities and the requested accuracy levels (e.g., with the minimum fidelity level or better) to the application. If the requested capabilities and/or accuracy levels cannot be met, notification is provided, via the input framework, to the user that identifies potential remedies or solutions to meet the requested capabilities and/or accuracy levels.

In some embodiments, the computing system is an augmented reality system or a virtual reality system. In some embodiments, a plurality of standard input capabilities is defined by the input framework. In some embodiments, the standard input capabilities include at least a subset of hand orientation, hand position, hand action, controller orientation, controller position, controller action, keyboard, air mouse, torso pose, and head pose. In some embodiments, each standard input capability is defined with at least three fidelity levels (e.g., high, medium, low).

Although some examples provided above are discussed in the context of EMG sensors as the example neuromuscular sensors, examples of neuromuscular sensors can also include, but are not limited to, mechanomyography (MMG) sensors, sonomyography (SMG) sensors, and electrical impedance tomography (EIT) sensors. The approaches described herein may also be implemented in wearable interfaces that communicate with computer hosts through wires and cables (e.g., USB cables, optical fiber cables), in addition to the wireless communication channels described in conjunction with various embodiments herein. Further embodiments also include various subsets of the above embodiments including embodiments combined or otherwise re-arranged.

In another aspect, some embodiments include a computing system including one or more processors and memory coupled to the one or more processors, the memory storing one or more programs configured to be executed by the one or more processors, the one or more programs including instructions for performing any of the methods described herein (e.g., methods 800 and 900, A1-A17, and B1-B5 above).

In yet another aspect, some implementations include a non-transitory computer-readable storage medium storing one or more programs for execution by one or more processors of a computing system, the one or more programs including instructions for performing any of the methods described herein (e.g., methods 800 and 900, A1-A17, and B1-B5 above).

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of using a hardware-agnostic input framework to determine how to provide input capabilities to applications, the method comprising:
    receiving, from an application executing on an operating system associated with an artificial-reality system that includes one or more human-machine-interface (HMI) devices, a request identifying a requested input capability for making an input operation available within the application; and
    in response to receiving the request:
        identifying, by the operating system, two or more techniques usable by the artificial-reality system to make the requested input capability available to the application using data from the one or more HMI devices, each of the two or more techniques associated with a respective fidelity level of at least two distinct fidelity levels at which the requested input capability can be made available to the application;
        selecting a first technique of the two or more techniques for making the requested input capability available to the application, wherein the first technique is selected based on a determination that (i) the first technique has a higher fidelity level at which the requested input capability can be made available to the application as compared to a second technique of the two or more techniques or (ii) the first technique utilizes less power for making the requested input capability available to the application as compared to the second technique; and
        providing to the application data to allow for performance of the requested input capability using the first technique.

2. The method of claim 1, wherein the first technique is selected by the operating system because it allows for performance of the requested input capability at a respective fidelity level that is higher than those associated with all other techniques of the two or more techniques.

3. The method of claim 1, wherein information regarding the two or more techniques are provided by the operating system to the application and the application performs the selecting.

4. The method of claim 1, further comprising:
in response to detecting that an additional HMI device is included in the artificial-reality system:
identifying, by the operating system, an additional technique, distinct from the two or more techniques, usable by the artificial-reality system to make the requested input capability available to the application at a respective fidelity level of the at least two distinct fidelity levels using data from the additional HMI device in addition to data from the one or more HMI devices; and
in accordance with a determination that the additional technique is associated with a respective fidelity level that is higher than the respective fidelity levels associated with the two or more techniques:
ceasing to use the first technique to provide the data to the application to allow for performance of the request input capability, and
using the additional technique to provide to the application updated data to allow for performance of the requested input capability.

5. The method of claim 1, wherein the application executing on the operating system is a first application, the requested input capability is a first requested input capability, and the method further comprises:
receiving, from a second application, distinct from the first application, executing on the operating system associated with the artificial-reality system, another request identifying a second requested input capability, distinct from the first request input capability, for making the input operation available within the second application;
in response to receiving the other request:
identifying, by the operating system, a technique that the artificial-reality system can be used to make the second requested input capability available to the second application using data from the one or more HMI devices; and
using the technique to provide, to the second application, data to allow for performance of the second requested input capability while continuing to use the first technique to provide data to the application to allow for performance of the requested input capability.

6. The method of claim 1, wherein data from a first HMI device is used in conjunction with the first technique, and the method further comprises:
in response to detecting that the first HMI device is no longer available:
selecting a different technique of the two or more techniques for making the requested input capability available to the application, the different technique being associated with a second fidelity level that is lower than a first fidelity level associated with the first technique; and
using the different technique to provide, to the application, data to allow for performance of the requested input capability.

7. The method of claim 6, further comprising:
in response to detecting that the first HMI device is no longer available, providing to the application an indication that the first technique is no longer available and that the different technique will be utilized instead to allow for performance of the requested input capability at a minimum fidelity level.

8. The method of claim 6, further comprising:
in response to detecting that the first HMI device is no longer available, notifying a user of the artificial-reality system that the requested input capability will be provided at a minimum fidelity level.

9. The method of claim 8, wherein notifying the user includes providing instructions specifying one or more additional HMI devices that can provide the requested input capability at a fidelity level from among the at least two distinct fidelity levels.

10. The method of claim 8, wherein notifying the user includes instructing a user to stop using the application until the requested input capability can be provided.

11. The method of claim 8, wherein notifying the user includes providing information about a degradation in performance.

12. The method of claim 8, wherein notifying the user includes providing information that the application is usable while the requested input capability is unavailable.

13. The method of claim 1, wherein the requested input capability uses one or more of: hand orientation, hand position, hand action, hand gesture, wrist gestures, wrist position, torso pose, and head pose to make the input operation available within the application.

14. The method of claim 1, wherein the one or more HMI devices includes a wrist-wearable device including one or more of an IMU sensor, a GPS, a WiFi antenna, a BLE antenna, an EMG sensor, a proximity sensor, and a camera; and
wherein the requested input capabilities provided by the wrist-wearable device include one or more of hand orientation, hand position, hand action, hand gesture, wrist gestures, wrist position, controller orientation, controller position, controller action, controller gesture, keyboard, and air mouse.

15. The method of claim 1, wherein the one or more HMI devices includes:
a head-worn device including one or more of an IMU sensor, a GPS, a WiFi antenna, a BLE antenna, an EMG sensor, a proximity sensor, a display and a camera; and
wherein the requested input capabilities provided by the head-worn device include one or more of hand orientation, hand position, hand action, hand gesture, wrist gestures, wrist position, controller orientation, controller position, controller action, controller gesture, keyboard, air mouse, torso pose, and head pose.

16. The method of claim 1, wherein the one or more HMI devices includes:
a controller including one or more of an IMU sensor, a GPS, a WiFi antenna, a BLE antenna, an EMG sensor, and a proximity sensor; and
wherein the requested input capabilities provided by the controller include one or more of hand orientation, hand position, hand action, wrist position, controller orientation, controller position, controller action, and controller gesture.

17. The method of claim 1, wherein the receiving is performed at initialization of the artificial-reality system, detecting availability of the one or more HMI devices for use with the artificial-reality system.

18. A system, comprising:
memory; and one or more processors coupled to the memory and in communication with one or more human-machine-interface (HMI) devices, the one or more processors configured for:

receiving, from an application executing on an operating system associated with the system, a request identifying a requested input capability for making an input operation available within the application; and in response to receiving the request:
- identifying, by the operating system, two or more techniques usable by the system to make the requested input capability available to the application using data from the one or more HMI devices, each of the two or more techniques associated with a respective fidelity level of at least two distinct fidelity levels at which the requested input capability can be made available to the application;
- selecting a first technique of the two or more techniques for making the requested input capability available to the application, wherein the first technique is selected based on a determination that (i) the first technique has a higher fidelity level at which the requested input capability can be made available to the application as compared to a second technique of the two or more techniques or (ii) the first technique utilizes less power for making the requested input capability available to the application as compared to the second technique; and
- providing to the application data to allow for performance of the requested input capability using the first technique.

19. The system of claim 18, wherein the first technique is selected by the operating system because it allows for performance of the requested input capability at a respective fidelity level that is higher than those associated with all other techniques of the two or more techniques.

20. A non-transitory computer-readable storage medium including instructions that, when executed by a system that is in communication with one or more human-machine-interface (HMI) devices, cause the system to:

receive, from an application executing on an operating system associated with the system, a request identifying a requested input capability for making an input operation available within the application; and in response to receiving the request:
- identify, by the operating system, two or more techniques usable by the system to make the requested input capability available to the application using data from the one or more HMI devices, each of the two or more techniques associated with a respective fidelity level of at least two distinct fidelity levels at which the requested input capability can be made available to the application;
- select a first technique of the two or more techniques for making the requested input capability available to the application, wherein the first technique is selected based on a determination that (i) the first technique has a higher fidelity level at which the requested input capability can be made available to the application as compared to a second technique of the two or more techniques or (ii) the first technique utilizes less power for making the requested input capability available to the application as compared to the second technique; and
- provide to the application data to allow for performance of the requested input capability using the first technique.

* * * * *